United States Patent
Fukui et al.

(10) Patent No.: US 10,421,271 B2
(45) Date of Patent: Sep. 24, 2019

(54) PRINTING APPARATUS AND CONTROL METHOD

(71) Applicant: CANON KABUSHIKI KAISHA, Tokyo (JP)

(72) Inventors: Kohei Fukui, Hachioji (JP); Masahiro Sugimoto, Yokohama (JP); Yuichiro Yanagi, Funabashi (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/018,559

(22) Filed: Jun. 26, 2018

(65) Prior Publication Data

US 2019/0009516 A1 Jan. 10, 2019

(30) Foreign Application Priority Data

Jul. 4, 2017 (JP) ................. 2017-131495

(51) Int. Cl.
| | |
|---|---|
| B41J 2/005 | (2006.01) |
| C09D 11/40 | (2014.01) |
| B41J 2/045 | (2006.01) |
| B41M 5/00 | (2006.01) |
| C09D 11/30 | (2014.01) |
| B41J 2/01 | (2006.01) |

(52) U.S. Cl.
CPC ......... B41J 2/0057 (2013.01); B41J 2/04513 (2013.01); B41M 5/0017 (2013.01); C09D 11/30 (2013.01); C09D 11/40 (2013.01); B41J 2002/012 (2013.01)

(58) Field of Classification Search
CPC .. B41J 2/0057; B41J 2/04513; B41M 5/0017; C09D 11/30; C09D 11/40
See application file for complete search history.

(56) References Cited

U.S. PATENT DOCUMENTS

| | | |
|---|---|---|
| 6,682,189 B2 | 1/2004 | May et al. |
| 6,767,092 B2 | 7/2004 | May et al. |
| 2018/0257412 A1 | 9/2018 | Sugimoto et al. |

(Continued)

FOREIGN PATENT DOCUMENTS

JP 2003-182064 A 7/2003

OTHER PUBLICATIONS

U.S. Appl. No. 16/015,958, Masahiro Sugimoto, Yuichiro Yanagi, Kohei Fukui, filed Jun. 22, 2018.

Primary Examiner — Lamson D Nguyen
(74) Attorney, Agent, or Firm — Venable LLP

(57) ABSTRACT

A printing apparatus includes at least one transfer section, a print unit forming an ink image on the transfer section, a transfer unit performing a transfer operation of transferring, to a print medium, and a liquid absorbing unit absorbing a liquid component from the ink image. The liquid absorbing unit includes a liquid absorbing sheet moved cyclically, and a displacing unit displacing the sheet between a contact state and a retracted state. The printing apparatus further includes an acceleration control unit controlling, if the sheet is displaced from the retracted state to the contact state, an acceleration operation of the transfer section and the sheet, and a determination unit determining an acceleration operation start portion which is located at a liquid absorbing position where the sheet contacts the transfer section when the acceleration control unit starts the acceleration operation.

12 Claims, 22 Drawing Sheets

(56) References Cited

U.S. PATENT DOCUMENTS

| | | |
|---|---|---|
| 2018/0272689 A1 | 9/2018 | Yanagi et al. |
| 2018/0272690 A1 | 9/2018 | Yanagi et al. |
| 2019/0009514 A1* | 1/2019 | Sugimoto .................. B41J 2/01 |
| 2019/0009515 A1* | 1/2019 | Deguchi ............... B41M 5/0256 |
| 2019/0009594 A1* | 1/2019 | Sakamoto ................ B41J 29/38 |

* cited by examiner

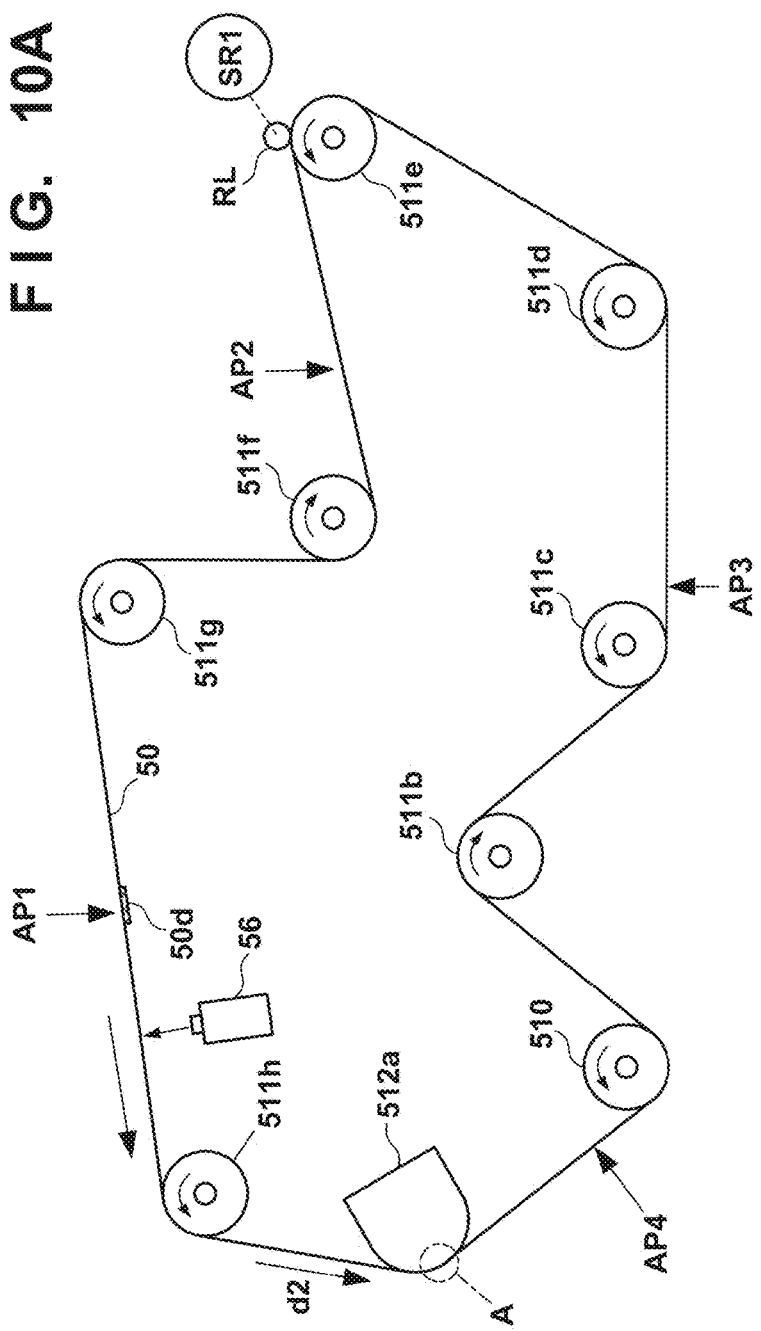

F I G. 16A
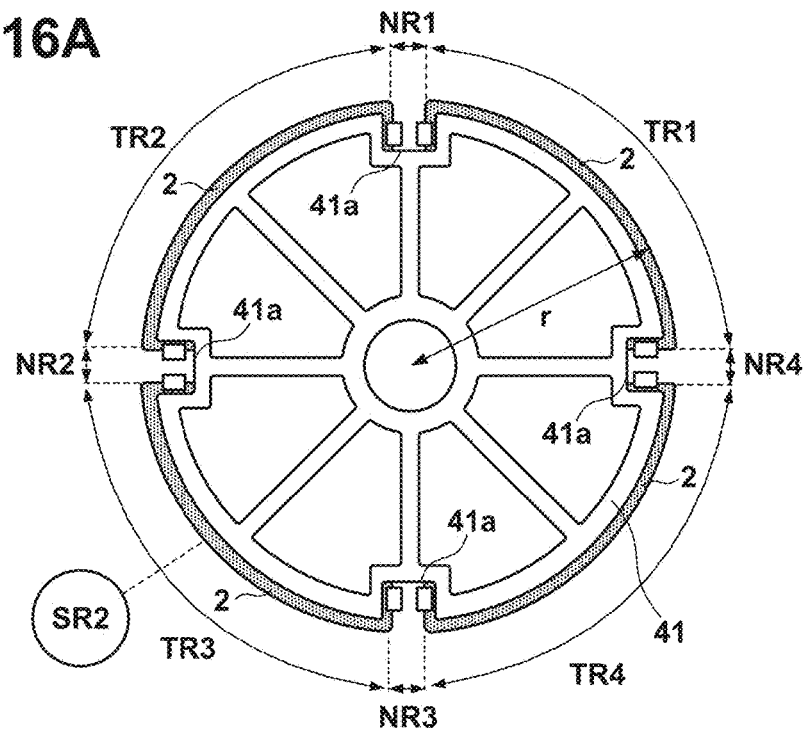
F I G. 16B
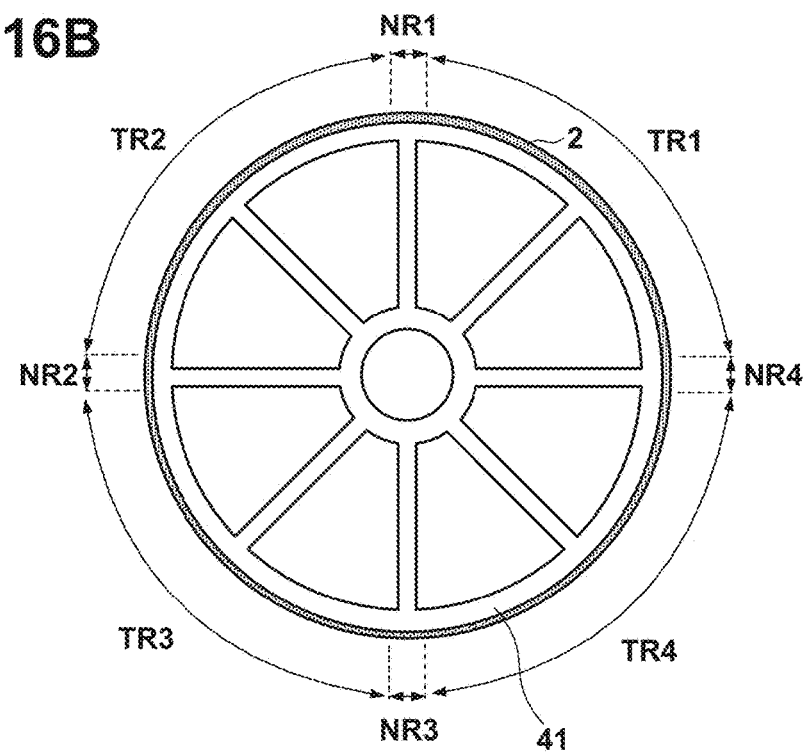

FIG. 19
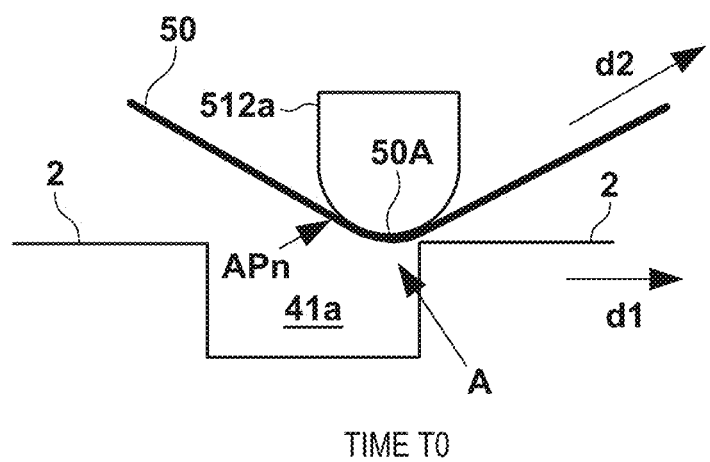
TIME T0
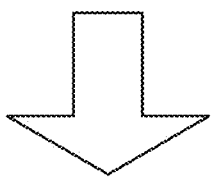
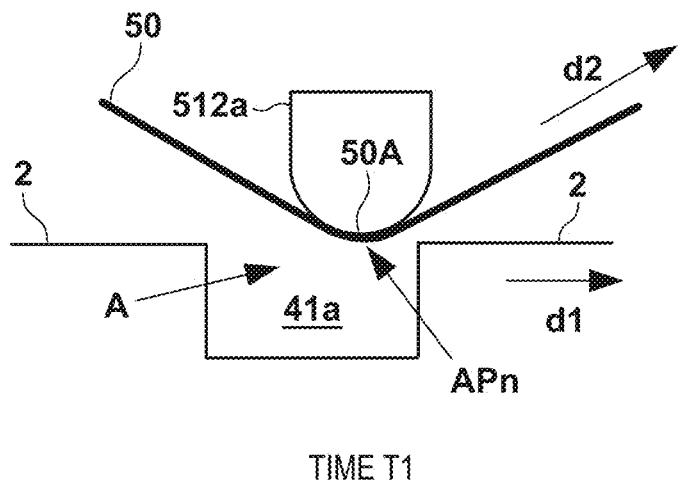
TIME T1

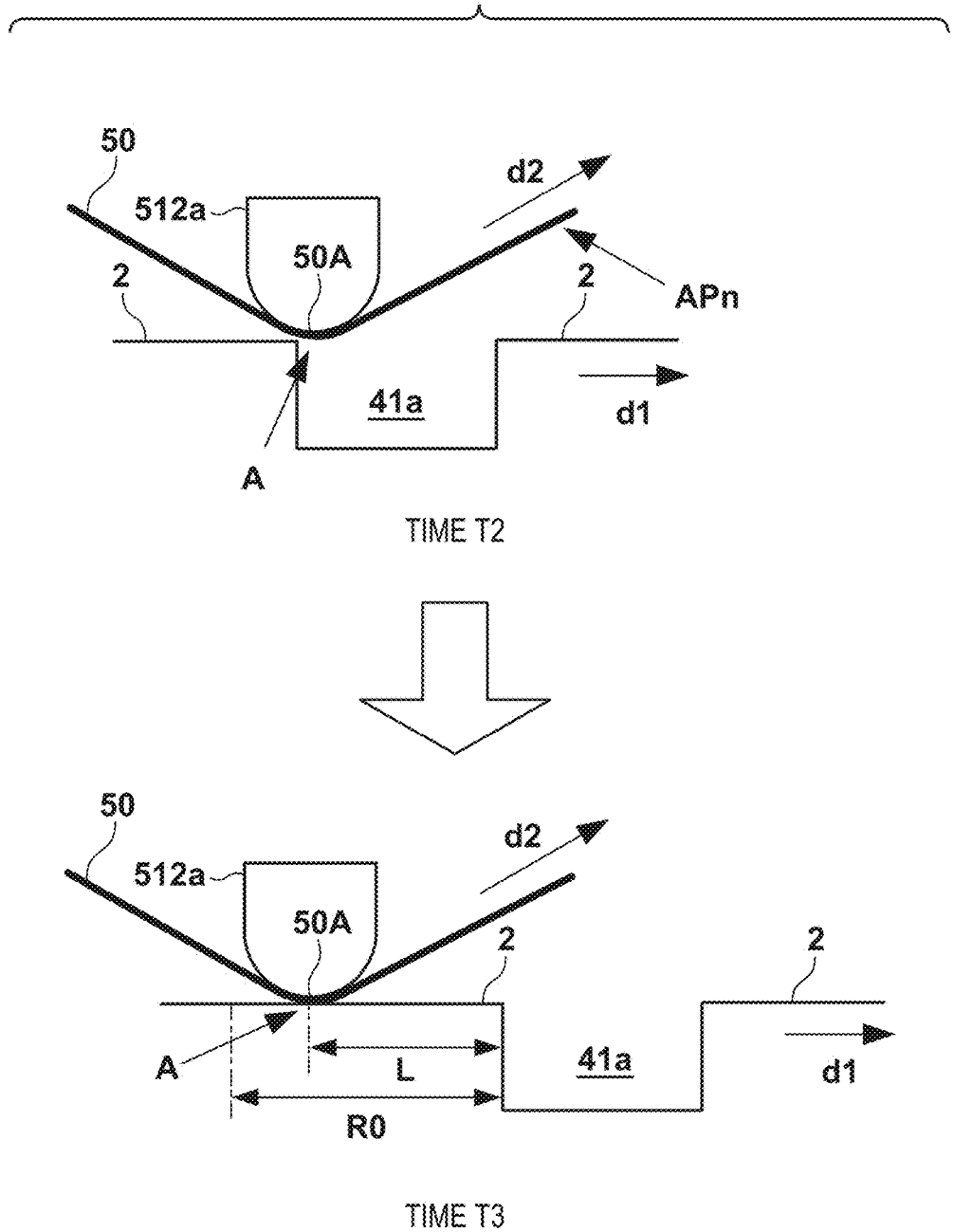

PRINTING APPARATUS AND CONTROL METHOD

BACKGROUND OF THE INVENTION

Field of the Invention

The present invention relates to a transfer type printing technique.

Description of the Related Art

A technique of forming an ink image on a transfer section and transferring it to a print medium such as paper is proposed. For example, Japanese Patent Laid-Open No. 2003-182064 discloses an image forming apparatus for forming an ink image on an intermediate member and transferring the ink image to a sheet. This apparatus includes an inkjet device that forms a primary image on the intermediate member. This apparatus also includes a zone where an aggregate is formed in the primary image, a zone where a liquid is partially removed from the aggregate, a zone where an image is transferred to a sheet, and a zone where the surface of the intermediate member is reproduced before a new primary image is formed.

An apparatus arrangement that removes a liquid component of an ink image in a state in which a liquid absorbing sheet for absorbing the liquid component contacts a transfer section may generate friction between the transfer section and the liquid absorbing sheet when accelerating the moving velocities of the liquid absorbing sheet and the transfer section. The life of the liquid absorbing sheet may be shortened by repeating an acceleration operation.

SUMMARY OF THE INVENTION

The present invention provides a technique of preventing the life of a liquid absorbing sheet from being shortened by repeating an acceleration operation.

According to an aspect of the present invention, there is provided a printing apparatus comprising: at least one transfer section configured to be moved cyclically; a print unit configured to form an ink image on the transfer section by discharging ink to the transfer section; a transfer unit configured to perform a transfer operation of transferring, to a print medium, the ink image formed on the transfer section; and a liquid absorbing unit configured to absorb a liquid component from the ink image on the transfer section before the transfer operation, the liquid absorbing unit including a liquid absorbing sheet configured to be moved cyclically, and a displacing unit configured to displace the liquid absorbing sheet between a contact state in which the liquid absorbing sheet can contact the transfer section and a retracted state in which the liquid absorbing sheet is separated from the transfer section, and the printing apparatus further comprising: an acceleration control unit configured to control, if the liquid absorbing sheet is displaced from the retracted state to the contact state, an acceleration operation of the transfer section and the liquid absorbing sheet; and a determination unit configured to determine an acceleration operation start portion which is located at a liquid absorbing position where the liquid absorbing sheet contacts the transfer section when the acceleration control unit starts the acceleration operation.

Further features of the present invention will become apparent from the following description of exemplary embodiments (with reference to the attached drawings).

BRIEF DESCRIPTION OF THE DRAWINGS

FIGS. 10A and 10B are explanatory views showing examples of an acceleration operation start portion;
FIGS. 16A and 16B are views each showing an example of the arrangement of a transfer drum and a transfer member;
FIG. 19 is an explanatory view showing acceleration control;
FIG. 20 is an explanatory view showing the acceleration control.

DESCRIPTION OF THE EMBODIMENTS

Embodiments of the present invention will be described with reference to the accompanying drawings. In each view, arrows X and Y indicate horizontal directions perpendicular to each other. An arrow Z indicates a vertical direction.

<Printing System>

Figure 1:
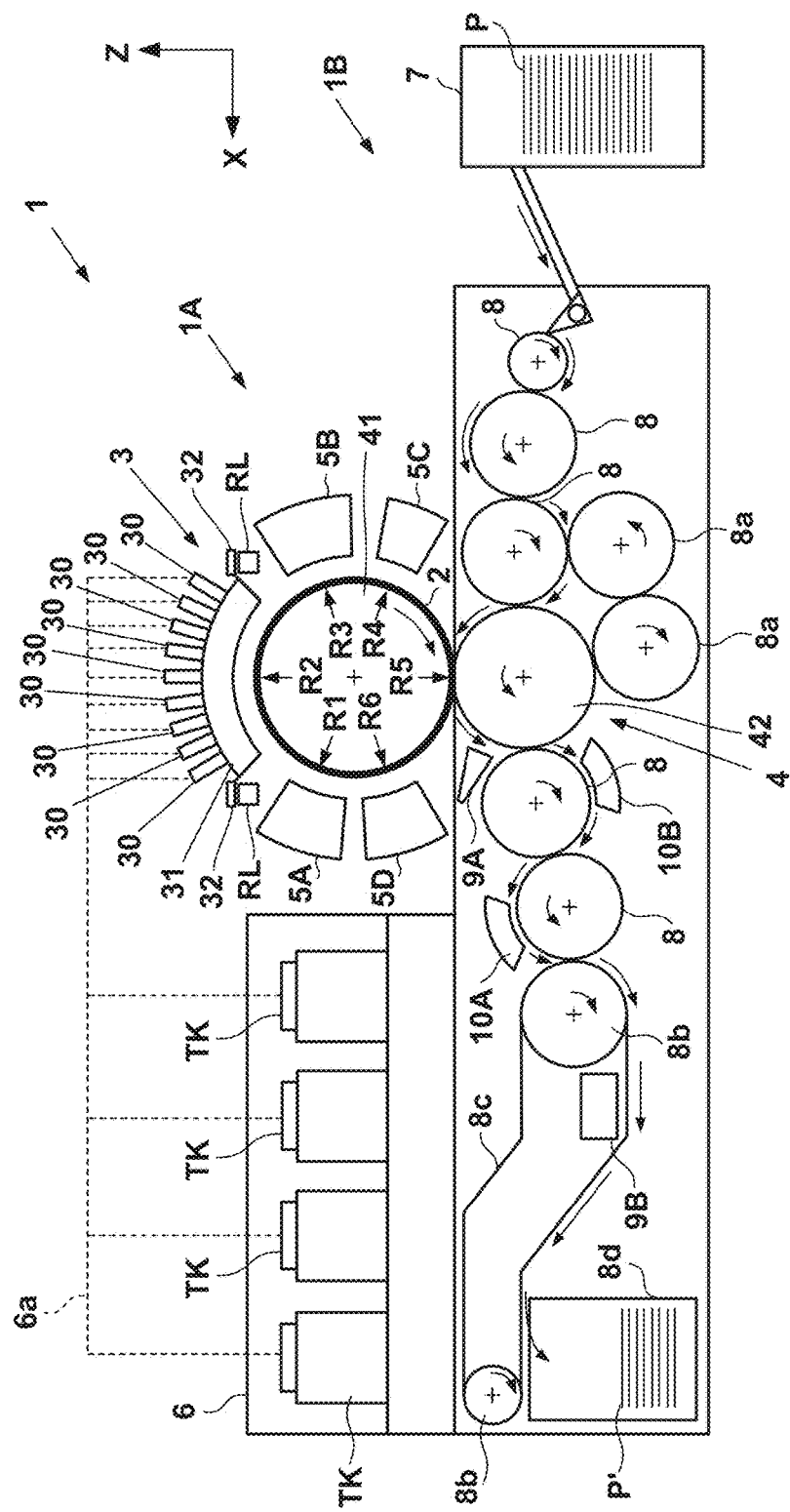
FIG. 1 is a schematic view showing a printing system.

FIG. 1 is a front view schematically showing a printing system (printing apparatus) 1 according to an embodiment of the present invention. The printing system 1 is a sheet inkjet printer that forms (manufactures) a printed product P' by transferring an ink image to a print medium P via a transfer member 2. The printing system 1 includes a printing apparatus 1A and a conveyance apparatus 1B. In this embodiment, an X direction, a Y direction, and a Z direction indicate the widthwise direction (total length direction), the depth direction, and the height direction of the printing system 1, respectively. The print medium P is conveyed in the X direction.

Note that "print" includes not only formation of significant information such as a character or graphic pattern but also formation of an image, design, or pattern on print media in a broader sense or processing of print media regardless of whether the information is significant or insignificant or has become obvious to allow human visual perception. In this embodiment, "print media" are assumed to be paper sheets but may be fabrics, plastic films, and the like.

An ink component is not particularly limited. In this embodiment, however, a case is assumed in which aqueous pigment ink that includes a pigment as a coloring material, water, and a resin is used.

<Printing Apparatus>

The printing apparatus 1A includes a print unit 3, a transfer unit 4, peripheral units 5A to 5D, and a supply unit 6.

<Print Unit>

Figure 2:
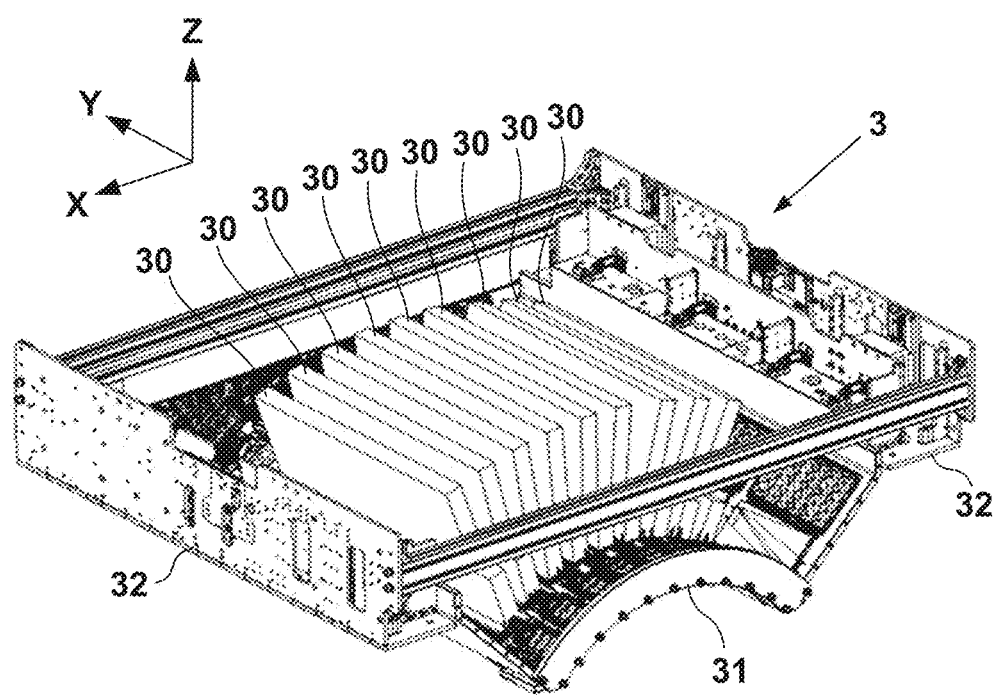
FIG. 2 is a perspective view showing a print unit.

The print unit 3 includes a plurality of printheads 30 and a carriage 31. A description will be made with reference to FIGS. 1 and 2. FIG. 2 is perspective view showing the print unit 3. The printheads 30 discharge liquid ink to the transfer member 2 and form ink images of a printed image on the transfer member 2.

In this embodiment, each printhead 30 is a full-line head elongated in the Y direction, and nozzles are arrayed in a range where they cover the width of an image printing area of a print medium having a usable maximum size. Each printhead 30 has an ink discharge surface with the opened nozzle on its lower surface, and the ink discharge surface faces the surface of the transfer member 2 via a minute gap (for example, several mm). In this embodiment, the transfer member 2 is configured to move on a circular orbit cyclically, and thus the plurality of printheads 30 are arranged radially.

Each nozzle includes a discharge element. The discharge element is, for example, an element that generates a pressure in the nozzle and discharges ink in the nozzle, and the technique of an inkjet head in a well-known inkjet printer is applicable. For example, an element that discharges ink by causing film boiling in ink with an electrothermal transducer and forming a bubble, an element that discharges ink by an electromechanical transducer (piezoelectric element), an element that discharges ink by using static electricity, or the like can be given as the discharge element. A discharge element that uses the electrothermal transducer can be used from the viewpoint of high-speed and high-density printing.

In this embodiment, nine printheads 30 are provided. The respective printheads 30 discharge different kinds of inks. The different kinds of inks are, for example, different in coloring material and include yellow ink, magenta ink, cyan ink, black ink, and the like. One printhead 30 discharges one kind of ink. However, one printhead 30 may be configured to discharge the plurality of kinds of inks. When the plurality of printheads 30 are thus provided, some of them may discharge ink (for example, clear ink) that does not include a coloring material.

The carriage 31 supports the plurality of printheads 30. The end of each printhead 30 on the side of an ink discharge surface is fixed to the carriage 31. This makes it possible to maintain a gap on the surface between the ink discharge surface and the transfer member 2 more precisely. The carriage 31 is configured to be displaceable while mounting the printheads 30 by the guide of each guide unit RL. In this embodiment, the guide units RL are rail-like structures elongated in the Y direction and provided as a pair separately in the X direction. A slide portion 32 is provided on each side of the carriage 31 in the X direction. The slide portions 32 engage with the guide members RL and slide along the guide members RL in the Y direction.

Figure 3:
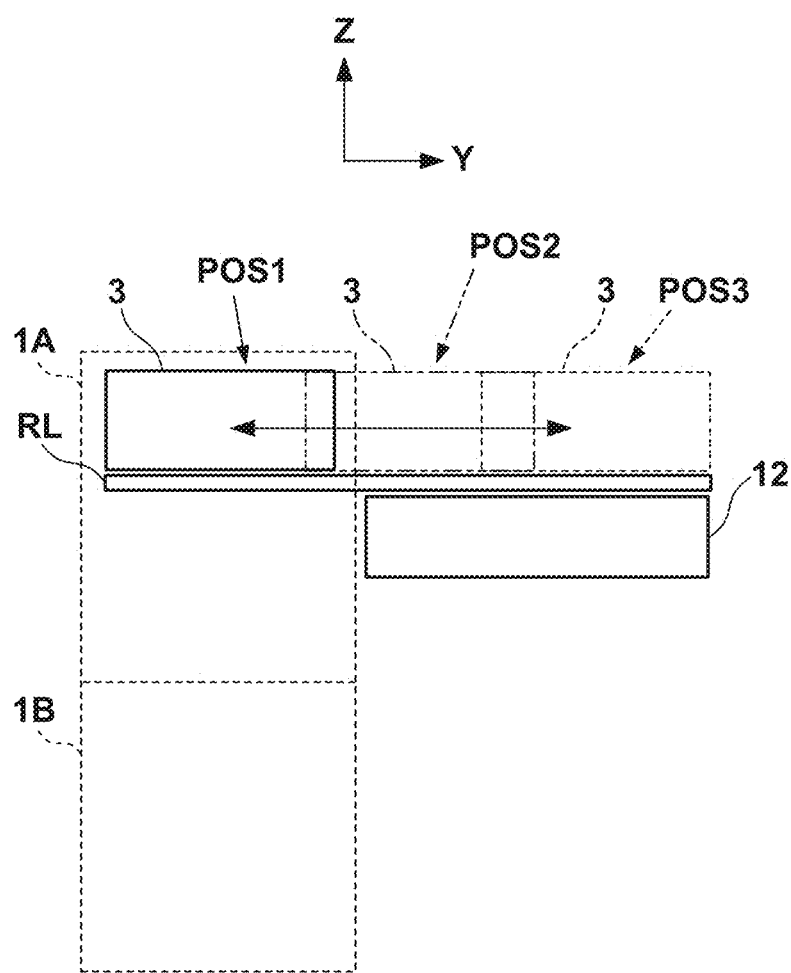
FIG. 3 is an explanatory view showing a displacement mode of the print unit in FIG. 2.

FIG. 3 is a view showing a displacement mode of the print unit 3 and schematically shows the right side surface of the printing system 1. A recovery unit 12 is provided in the rear of the printing system 1. The recovery unit 12 has a mechanism for recovering discharge performance of the printheads 30. For example, a cap mechanism which caps the ink discharge surface of each printhead 30, a wiper mechanism which wipes the ink discharge surface, a suction mechanism which sucks ink in the printhead 30 by a negative pressure from the ink discharge surface can be given as such mechanisms.

The guide unit RL is elongated over the recovery unit 12 from the side of the transfer member 2. By the guide of the guide unit RL, the print unit 3 is displaceable between a discharge position POS1 at which the print unit 3 is indicated by a solid line and a recovery position POS3 at which the print unit 3 is indicated by a broken line, and is moved by a driving mechanism (not shown).

The discharge position POS1 is a position at which the print unit 3 discharges ink to the transfer member 2 and a position at which the ink discharge surface of each printhead 30 faces the surface of the transfer member 2. The recovery position POS3 is a position retracted from the discharge position POS1 and a position at which the print unit 3 is positioned above the recovery unit 12. The recovery unit 12 can perform performance recovery processing on the printheads 30 when the print unit 3 is positioned at the recovery position POS3. In this embodiment, the recovery unit 12 can also perform the recovery processing in the middle of movement before the print unit 3 reaches the recovery position POS3. There is a preliminary recovery position POS2 between the discharge position POS1 and the recovery position POS3. The recovery unit 12 can perform preliminary recovery processing on the printheads 30 at the preliminary recovery position POS2 while the printheads 30 move from the discharge position POS1 to the recovery position POS3.

<Transfer Unit>

The transfer unit 4 will be described with reference to FIG. 1. The transfer unit 4 includes a transfer drum (transfer cylinder) 41 and a pressurizing drum 42. Each of these drums is a rotating body that rotates about a rotation axis in the Y direction and has a columnar outer peripheral surface. In FIG. 1, arrows shown in respective views of the transfer drum 41 and the pressurizing drum 42 indicate their rotation directions. The transfer drum 41 rotates clockwise, and the pressurizing drum 42 rotates anticlockwise.

The transfer drum 41 is a support member that supports the transfer member 2 on its outer peripheral surface. The transfer member 2 is provided on the outer peripheral surface of the transfer drum 41 continuously or intermittently in a circumferential direction. If the transfer member 2 is provided continuously, it is formed into an endless swath. If the transfer member 2 is provided intermittently, it is formed into swaths with ends divided into a plurality of segments. The respective segments can be arranged in an arc at an equal pitch on the outer peripheral surface of the transfer drum 41.

The transfer member 2 moves cyclically on the circular orbit by rotating the transfer drum 41. By the rotational phase of the transfer drum 41, the position of the transfer member 2 can be discriminated into a processing area R1 before discharge, a discharge area R2, processing areas R3 and R4 after discharge, a transfer area R5, and a processing area R6 after transfer. The transfer member 2 passes through these areas cyclically.

The processing area R1 before discharge is an area where preprocessing is performed on the transfer member 2 before the print unit 3 discharges ink and an area where the peripheral unit 5A performs processing. In this embodiment, a reactive liquid is applied. The discharge area R2 is a formation area where the print unit 3 forms an ink image by discharging ink to the transfer member 2. The processing areas R3 and R4 after discharge are processing areas where processing is performed on the ink image after ink discharge. The processing area R3 after discharge is an area where the peripheral unit 5B performs processing, and the processing area R4 after discharge is an area where the peripheral unit 5C performs processing. The transfer area R5 is an area where the transfer unit 4 transfers the ink image on the transfer member 2 to the print medium P. The processing area R6 after transfer is an area where post processing is performed on the transfer member 2 after transfer and an area where the peripheral unit 5D performs processing.

In this embodiment, the discharge area R2 is an area with a predetermined section. The other areas R1 and R3 to R6 have narrower sections than the discharge area R2. Comparing to the face of a clock, in this embodiment, the processing area R1 before discharge is positioned at almost 10 o'clock, the discharge area R2 is in a range from almost 11 o'clock to 1 o'clock, the processing area R3 after discharge is positioned at almost 2 o'clock, and the processing area R4 after discharge is positioned at almost 4 o'clock. The transfer area R5 is positioned at almost 6 o'clock, and the processing area R6 after transfer is an area at almost 8 o'clock.

The transfer member 2 may be formed by a single layer but may be an accumulative body of a plurality of layers. If the transfer member 2 is formed by the plurality of layers, it may include three layers of, for example, a surface layer, an elastic layer, and a compressed layer. The surface layer is an outermost layer having an image formation surface where the ink image is formed. By providing the compressed layer, the compressed layer absorbs deformation and disperses a local pressure fluctuation, making it possible to maintain transferability even at the time of high-speed printing. The elastic layer is a layer between the surface layer and the compressed layer.

As a material for the surface layer, various materials, such as a resin and a ceramic, can be used appropriately. With respect to durability, or the like, however, a material high in compressive modulus can be used. More specifically, an acrylic resin, an acrylic silicone resin, a fluoride-containing resin, a condensate obtained by condensing a hydrolyzable organosilicon compound, and the like, can be used. The surface layer that has undergone a surface treatment may be used in order to improve wettability of the reactive liquid, the transferability of an image, or the like. Frame processing, a corona treatment, a plasma treatment, a polishing treatment, a roughening treatment, an active energy beam irradiation treatment, an ozone treatment, a surfactant treatment, a silane coupling treatment, or the like, can be used as the surface treatment. A plurality of these treatments may be combined. It is also possible to provide any desired surface shape in the surface layer.

For example, acrylonitrile-butadiene rubber, acrylic rubber, chloroprene rubber, urethane rubber, silicone rubber, or the like can be given as a material for the compressed layer. When such a rubber material is formed, a porous rubber material may be formed by blending a predetermined amount of a vulcanizing agent, vulcanizing accelerator, or the like and further blending a foaming agent, or a filling agent such as hollow fine particles or salt as needed. Consequently, a bubble portion is compressed along with a volume change with respect to various pressure fluctuations, and thus deformation in directions other than a compression direction is small, making it possible to obtain more stable transferability and durability. As the porous rubber material, there are a material having an open cell structure in which respective pores continue to each other and a material having a closed cell structure in which the respective pores are independent of each other. However, either structure may be used, or both of these structures may be used.

As a member for the elastic layer, the various materials, such as the resins and the ceramics, can be used appropriately. With respect to processing characteristics, various materials of an elastomer material and a rubber material can be used. More specifically, for example, fluorosilicone rubber, phenyl silicone rubber, fluorine rubber, chloroprene rubber, urethane rubber, nitrile rubber, and the like, can be used. In addition, ethylene propylene rubber, natural rubber, styrene rubber, isoprene rubber, butadiene rubber, the copolymer of ethylene/propylene/butadiene, nitrile-butadiene rubber, and the like, can be used. In particular, silicone rubber, fluorosilicone rubber, and phenyl silicon rubber are advantageous in terms of dimensional stability and durability because of their small compression set. They are also advantageous in terms of transferability because of their small elasticity change by a temperature.

Between the surface layer and the elastic layer and between the elastic layer and the compressed layer, various adhesives or double-sided adhesive tapes can also be used in order to fix them to each other. The transfer member 2 may also include a reinforce layer high in compressive modulus in order to suppress elongation in a horizontal direction or maintain resilience when attached to the transfer drum 41. Woven fabric may be used as a reinforce layer. The transfer member 2 can be manufactured by combining the respective layers formed by the materials described above in any desired manner.

The outer peripheral surface of the pressurizing drum 42 is pressed against the transfer member 2. At least one grip mechanism which grips the leading edge portion of the print medium P is provided on the outer peripheral surface of the pressurizing drum 42. A plurality of grip mechanisms may be provided separately in the circumferential direction of the pressurizing drum 42. The ink image on the transfer member 2 is transferred to the print medium P when it passes through a nip portion between the pressurizing drum 42 and the transfer member 2 while being conveyed in tight contact with the outer peripheral surface of the pressurizing drum 42.

The transfer drum 41 and the pressurizing drum 42 can share a driving source such as a motor that drives them, and a driving force can be delivered by a transmission mechanism such as a gear mechanism.

<Peripheral Unit>

The peripheral units 5A to 5D are arranged around the transfer drum 41. In this embodiment, the peripheral units 5A to 5D are specifically an application unit, an absorption unit, a heating unit, and a cleaning unit in order.

The application unit 5A is a mechanism which applies the reactive liquid onto the transfer member 2 before the print unit 3 discharges ink. The reactive liquid is a liquid that contains a component increasing an ink viscosity. An increase in ink viscosity here means that a coloring material, a resin, and the like that form the ink react chemically or suck physically by contacting the component that increases the ink viscosity, recognizing the increase in ink viscosity.

This increase in ink viscosity includes not only a case in which an increase in viscosity of entire ink is recognized but also a case in which a local increase in viscosity is generated by coagulating some of components such as the coloring material and the resin that form the ink.

The component that increases the ink viscosity can use, without particular limitation, a substance such as metal ions or a polymeric coagulant that causes a pH change in ink and coagulates the coloring material in the ink, and can use an organic acid. For example, a roller, a printhead, a die coating apparatus (die coater), a blade coating apparatus (blade coater), or the like can be given as a mechanism which applies the reactive liquid. If the reactive liquid is applied to the transfer member 2 before the ink is discharged to the transfer member 2, it is possible to immediately fix ink that reaches the transfer member 2. This makes it possible to suppress bleeding caused by mixing adjacent inks.

The absorption unit 5B is a mechanism which absorbs a liquid component from the ink image on the transfer member 2 before transfer. It is possible to suppress, for example, a blur of an image printed on the print medium P by decreasing the liquid component of the ink image. Describing a decrease in liquid component from another point of view, it is also possible to represent it as condensing ink that forms the ink image on the transfer member 2. Condensing the ink means increasing the content of a solid content such as a coloring material or a resin included in the ink with respect to the liquid component by decreasing the liquid component included in the ink.

The absorption unit 5B includes, for example, a liquid absorbing member that decreases the amount of the liquid component of the ink image by contacting the ink image. The liquid absorbing member may be formed on the outer peripheral surface of the roller or may be formed into an endless sheet-like shape and run cyclically. In terms of protection of the ink image, the liquid absorbing member may be moved in synchronism with the transfer member 2 by making the moving speed of the liquid absorbing member equal to the peripheral speed of the transfer member 2.

The liquid absorbing member may include a porous body that contacts the ink image. The pore size of the porous body on the surface that contacts the ink image may be equal to or smaller than 10 μm in order to suppress adherence of an ink solid content to the liquid absorbing member. The pore size here refers to an average diameter and can be measured by a known means such as a mercury intrusion technique, a nitrogen adsorption method, an SEM image observation, or the like. Note that the liquid component does not have a fixed shape, and is not particularly limited if it has fluidity and an almost constant volume. For example, water, an organic solvent, or the like contained in the ink or reactive liquid can be given as the liquid component.

The heating unit 5C is a mechanism which heats the ink image on the transfer member 2 before transfer. A resin in the ink image melts by heating the ink image, improving transferability to the print medium P. A heating temperature can be equal to or higher than the minimum film forming temperature (MFT) of the resin. The MFT can be measured by each apparatus that complies with a generally known method such as JIS K 6828-2: 2003 or ISO 2115: 1996. From the viewpoint of transferability and image robustness, the ink image may be heated at a temperature higher than the MFT by 10° C. or higher, or may further be heated at a temperature higher than the MFT by 20° C. or higher. The heating unit 5C can use a known heating device, for example, various lamps such as infrared rays, a warm air fan, or the like. An infrared heater can be used in terms of heating efficiency.

The cleaning unit 5D is a mechanism which cleans the transfer member 2 after transfer. The cleaning unit 5D removes ink remaining on the transfer member 2, dust on the transfer member 2, or the like. The cleaning unit 5D can use a known method, for example, a method of bringing a porous member into contact with the transfer member 2, a method of scraping the surface of the transfer member 2 with a brush, a method of scratching the surface of the transfer member 2 with a blade, or the like as needed. A known shape such as a roller shape or a web shape can be used for a cleaning member used for cleaning.

As described above, in this embodiment, the application unit 5A, the absorption unit 5B, the heating unit 5C, and the cleaning unit 5D are included as the peripheral units. However, cooling functions of the transfer member 2 may be applied, or cooling units may be added to these units. In this embodiment, the temperature of the transfer member 2 may be increased by heat of the heating unit 5C. If the ink image exceeds the boiling point of water as a prime solvent of ink after the print unit 3 discharges ink to the transfer member 2, performance of liquid component absorption by the absorption unit 5B may be degraded. It is possible to maintain the performance of liquid component absorption by cooling the transfer member 2 such that the temperature of the discharged ink is maintained below the boiling point of water.

The cooling unit may be an air blowing mechanism which blows air to the transfer member 2, or a mechanism which brings a member (for example, a roller) into contact with the transfer member 2 and cools this member by air-cooling or water-cooling. The cooling unit may be a mechanism which cools the cleaning member of the cleaning unit 5D. A cooling timing may be a period before application of the reactive liquid after transfer.

<Supply Unit>

The supply unit 6 is a mechanism which supplies ink to each printhead 30 of the print unit 3. The supply unit 6 may be provided on the rear side of the printing system 1. The supply unit 6 includes a reservoir TK that reserves ink for each kind of ink. Each reservoir TK may be made of a main tank and a sub tank. Each reservoir TK and a corresponding one of the printheads 30 communicate with each other by a liquid passageway 6a, and ink is supplied from the reservoir TK to the printhead 30. The liquid passageway 6a may circulate ink between the reservoirs TK and the printheads 30. The supply unit 6 may include, for example, a pump that circulates ink. A deaerating mechanism which deaerates bubbles in ink may be provided in the middle of the liquid passageway 6a or in each reservoir TK. A valve that adjusts the fluid pressure of ink and an atmospheric pressure may be provided in the middle of the liquid passageway 6a or in each reservoir TK. The heights of each reservoir TK and each printhead 30 in the Z direction may be designed such that the liquid surface of ink in the reservoir TK is positioned lower than the ink discharge surface of the printhead 30.

<Conveyance Apparatus>

The conveyance apparatus 1B is an apparatus that feeds the print medium P to the transfer unit 4 and discharges, from the transfer unit 4, the printed product P' to which the ink image was transferred. The conveyance apparatus 1B includes a feeding unit 7, a plurality of conveyance drums 8 and 8a, two sprockets 8b, a chain 8c, and a collection unit 8d. In FIG. 1, an arrow inside a view of each constituent element in the conveyance apparatus 1B indicates a rotation direction of the constituent element, and an arrow outside the view of each constituent element indicates a conveyance path of the print medium P or the printed product P'. The print medium P is conveyed from the feeding unit 7 to the transfer unit 4, and the printed product P' is conveyed from the transfer unit 4 to the collection unit 8*d*. The side of the feeding unit 7 may be referred to as an upstream side in a conveyance direction, and the side of the collection unit 8*d* may be referred to as a downstream side.

The feeding unit 7 includes a stacking unit where the plurality of print media P are stacked and a feeding mechanism which feeds the print media P one by one from the stacking unit to the most upstream conveyance drum 8. Each of the conveyance drums 8 and 8*a* is a rotating body that rotates about the rotation axis in the Y direction and has a columnar outer peripheral surface. At least one grip mechanism which grips the leading edge portion of the print medium P (printed product P') is provided on the outer peripheral surface of each of the conveyance drums 8 and 8*a*. A gripping operation and release operation of each grip mechanism may be controlled such that the print medium P is transferred between the adjacent conveyance drums.

The two conveyance drums 8*a* are used to reverse the print medium P. When the print medium P undergoes double-side printing, it is not transferred to the conveyance drum 8 adjacent on the downstream side but transferred to the conveyance drums 8*a* from the pressurizing drum 42 after transfer onto the surface. The print medium P is reversed via the two conveyance drums 8*a* and transferred to the pressurizing drum 42 again via the conveyance drums 8 on the upstream side of the pressurizing drum 42. Consequently, the reverse surface of the print medium P faces the transfer drum 41, transferring the ink image to the reverse surface.

The chain 8*c* is wound between the two sprockets 8*b*. One of the two sprockets 8*b* is a driving sprocket, and the other is a driven sprocket. The chain 8*c* runs cyclically by rotating the driving sprocket. The chain 8*c* includes a plurality of grip mechanisms spaced apart from each other in its longitudinal direction. Each grip mechanism grips the end of the printed product P'. The printed product P' is transferred from the conveyance drum 8 positioned at a downstream end to each grip mechanism of the chain 8*c*, and the printed product P' gripped by the grip mechanism is conveyed to the collection unit 8*d* by running the chain 8*c*, releasing gripping. Consequently, the printed product P' is stacked in the collection unit 8*d*.

<Post Processing Unit>

The conveyance apparatus 1B includes post processing units 10A and 10B. The post processing units 10A and 10B are mechanisms which are arranged on the downstream side of the transfer unit 4, and perform post processing on the printed product P'. The post processing unit 10A performs processing on the obverse surface of the printed product P', and the post processing unit 10B performs processing on the reverse surface of the printed product P'. The contents of the post processing includes, for example, coating that aims at protection, glossy, and the like of an image on the image printed surface of the printed product P'. For example, liquid application, sheet welding, lamination, and the like can be given as an example of coating.

<Inspection Unit>

The conveyance apparatus 1B includes inspection units 9A and 9B. The inspection units 9A and 9B are mechanisms which are arranged on the downstream side of the transfer unit 4, and inspect the printed product P'.

In this embodiment, the inspection unit 9A is an image capturing apparatus that captures an image printed on the printed product P' and includes an image sensor, for example, a CCD sensor, a CMOS sensor, or the like. The inspection unit 9A captures a printed image while a printing operation is performed continuously. Based on the image captured by the inspection unit 9A, it is possible to confirm a temporal change in tint or the like of the printed image and determine whether to correct image data or print data. In this embodiment, the inspection unit 9A has an imaging range set on the outer peripheral surface of the pressurizing drum 42 and is arranged to be able to partially capture the printed image immediately after transfer. The inspection unit 9A may inspect all printed images or may inspect the images every predetermined sheets.

In this embodiment, the inspection unit 9B is also an image capturing apparatus that captures an image printed on the printed product P' and includes an image sensor, for example, a CCD sensor, a CMOS sensor, or the like. The inspection unit 9B captures a printed image in a test printing operation. The inspection unit 9B can capture the entire printed image. Based on the image captured by the inspection unit 9B, it is possible to perform basic settings for various correction operations regarding print data. In this embodiment, the inspection unit 9B is arranged at a position to capture the printed product P' conveyed by the chain 8*c*. When the inspection unit 9B captures the printed image, it captures the entire image by temporarily suspending the run of the chain 8*c*. The inspection unit 9B may be a scanner that scans the printed product P'.

<Control Unit>

Figure 4:
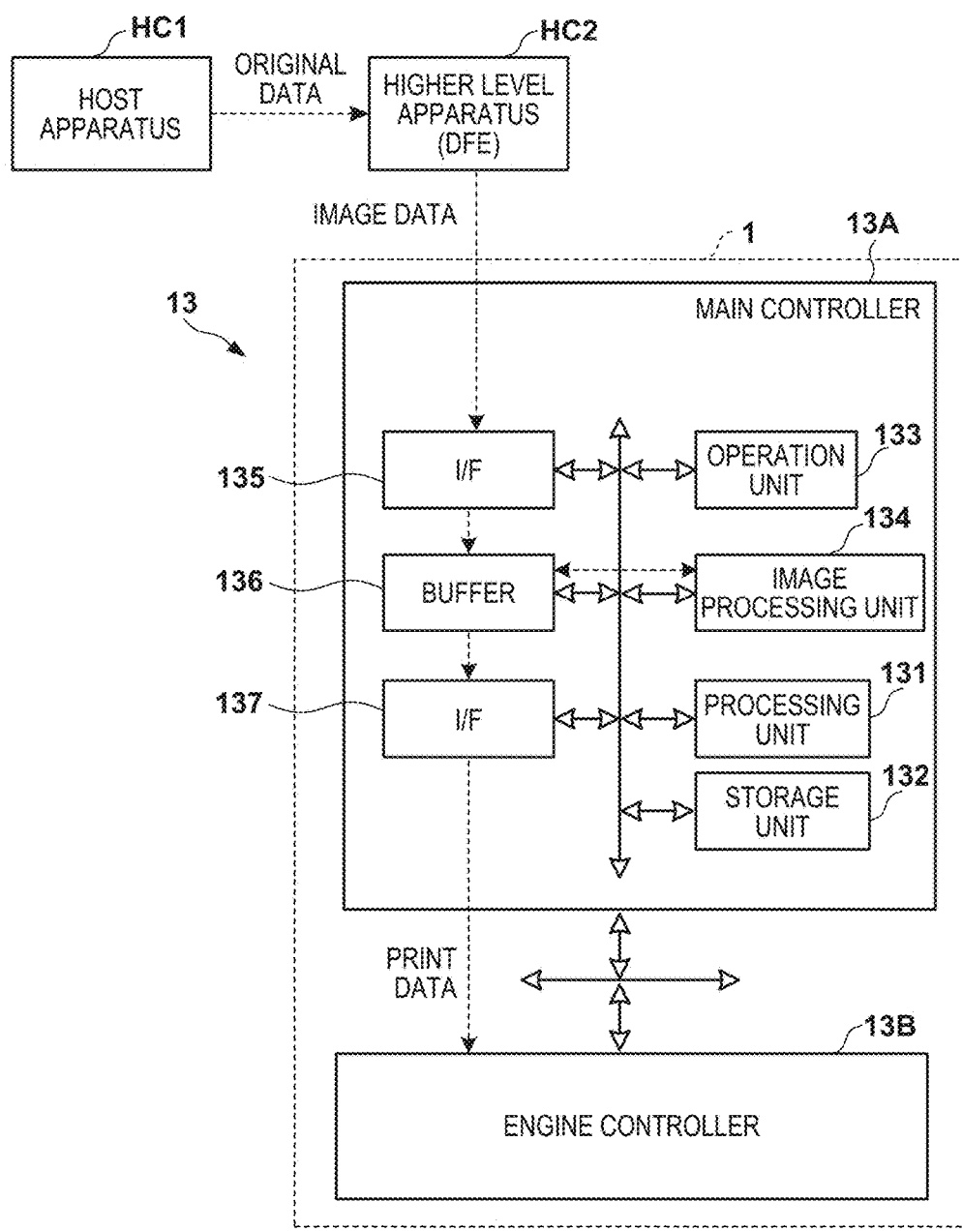
FIG. 4 is a block diagram showing a control system of the printing system in FIG. 1.
Figure 5:
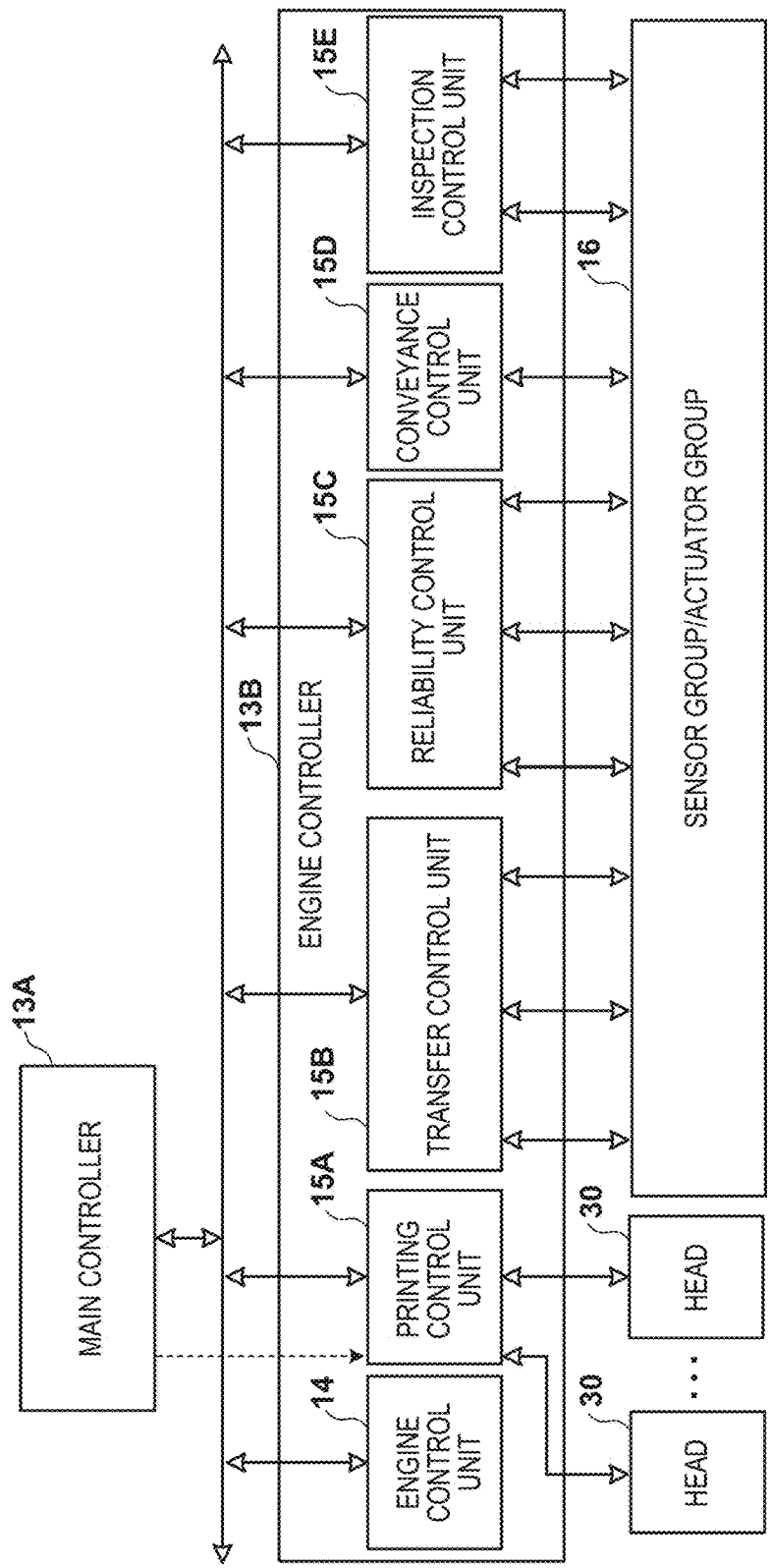
FIG. 5 is a block diagram showing the control system of the printing system in FIG. 1.

A control unit of the printing system 1 will be described next. FIGS. 4 and 5 are block diagrams each showing a control unit 13 of the printing system 1. The control unit 13 is communicably connected to a higher level apparatus (DFE) HC2, and the higher level apparatus HC2 is communicably connected to a host apparatus HC1.

Original data to be the source of a printed image is generated or saved in the host apparatus HC1. The original data here is generated in the format of, for example, an electronic file such as a document file or an image file. This original data is transmitted to the higher level apparatus HC2. In the higher level apparatus HC2, the received original data is converted into a data format (for example, RGB data that represents an image by RGB) available by the control unit 13. The converted data is transmitted from the higher level apparatus HC2 to the control unit 13 as image data. The control unit 13 starts a printing operation based on the received image data.

In this embodiment, the control unit 13 is roughly divided into a main controller 13A and an engine controller 13B. The main controller 13A includes a processing unit 131, a storage unit 132, an operation unit 133, an image processing unit 134, a communication I/F (interface) 135, a buffer 136, and a communication I/F 137.

The processing unit 131 is a processor such as a CPU, executes programs stored in the storage unit 132, and controls the entire main controller 13A. The storage unit 132 is a storage device such as a RAM, a ROM, a hard disk, or an SSD, stores data and the programs executed by the processing unit (CPU) 131, and provides the processing unit (CPU) 131 with a work area. The operation unit 133 is, for example, an input device such as a touch panel, a keyboard, or a mouse and accepts a user instruction.

The image processing unit 134 is, for example, an electronic circuit including an image processing processor. The buffer 136 is, for example, a RAM, a hard disk, or an SSD.

The communication I/F 135 communicates with the higher level apparatus HC2, and the communication I/F 137 communicates with the engine controller 13B. In FIG. 4, broken-line arrows exemplify the processing sequence of image data. Image data received from the higher level apparatus HC2 via the communication I/F 135 is accumulated in the buffer 136. The image processing unit 134 reads out the image data from the buffer 136, performs predetermined image processing on the readout image data, and stores the processed data in the buffer 136 again. The image data after the image processing stored in the buffer 136 is transmitted from the communication I/F 137 to the engine controller 13B as print data used by a print engine.

As shown in FIG. 5, the engine controller 13B includes control units 14 and 15A to 15E, and obtains a detection result of a sensor group/actuator group 16 of the printing system 1 and controls driving of the groups. Each of these control units includes a processor such as a CPU, a storage device such as a RAM or a ROM, and an interface with an external device. Note that the division of the control units is merely illustrative, and a plurality of subdivided control units may perform some of control operations or conversely, the plurality of control units may be integrated with each other, and one control unit may be configured to implement their control contents.

The engine control unit 14 controls the entire engine controller 13B. The printing control unit 15A converts print data received from the main controller 13A into raster data or the like in a data format suitable for driving of the printheads 30. The printing control unit 15A controls discharge of each printhead 30.

The transfer control unit 15B controls the application unit 5A, the absorption unit 5B, the heating unit 5C, and the cleaning unit 5D.

The reliability control unit 15C controls the supply unit 6, the recovery unit 12, and a driving mechanism which moves the print unit 3 between the discharge position POS1 and the recovery position POS3.

The conveyance control unit 15D controls driving of the transfer unit 4 and controls the conveyance apparatus 1B. The inspection control unit 15E controls the inspection unit 9B and the inspection unit 9A.

Of the sensor group/actuator group 16, the sensor group includes a sensor that detects the position and speed of a movable part, a sensor that detects a temperature, an image sensor, and the like. The actuator group includes a motor, an electromagnetic solenoid, an electromagnetic valve, and the like.

<Operation Example>

Figure 6:
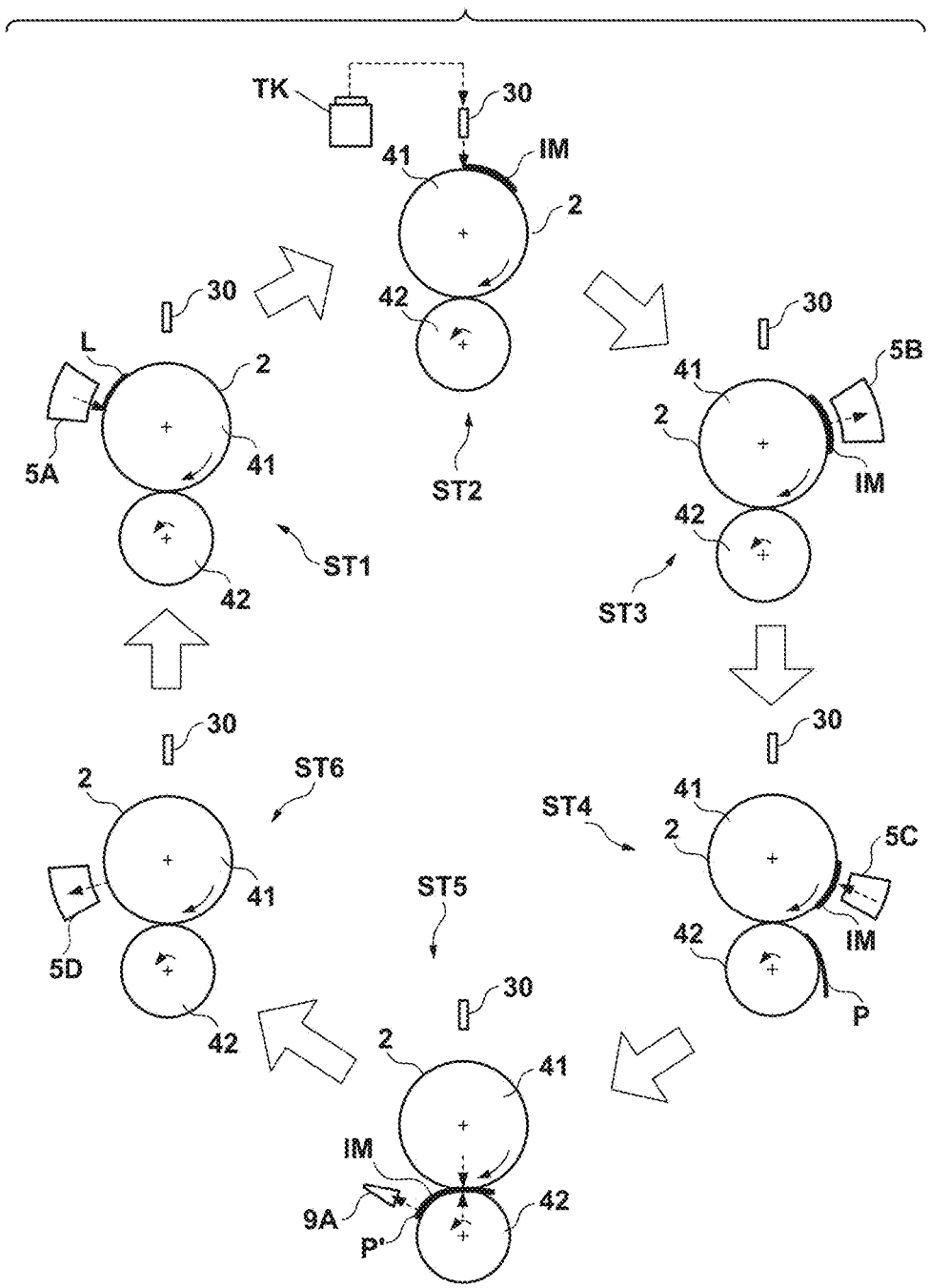
FIG. 6 is an explanatory view showing an example of the operation of the printing system in FIG. 1.

FIG. 6 is a view schematically showing an example of a printing operation. Respective steps below are performed cyclically while rotating the transfer drum 41 and the pressurizing drum 42. As shown in a state ST1, first, a reactive liquid L is applied from the application unit 5A onto the transfer member 2. A portion to which the reactive liquid L on the transfer member 2 is applied moves along with the rotation of the transfer drum 41. When the portion to which the reactive liquid L is applied reaches under the printhead 30, ink is discharged from the printhead 30 to the transfer member 2 as shown in a state ST2. Consequently, an ink image IM is formed. At this time, the discharged ink mixes with the reactive liquid L on the transfer member 2, promoting coagulation of the coloring materials. The discharged ink is supplied from the reservoir TK of the supply unit 6 to the printhead 30.

The ink image IM on the transfer member 2 moves along with the rotation of the transfer member 2. When the ink image IM reaches the absorption unit 5B, as shown in a state ST3, the absorption unit 5B absorbs a liquid component from the ink image IM. When the ink image IM reaches the heating unit 5C, as shown in a state ST4, the heating unit 5C heats the ink image IM, a resin in the ink image IM melts, and a film of the ink image IM is formed. In synchronism with such formation of the ink image IM, the conveyance apparatus 1B conveys the print medium P.

As shown in a state ST5, the ink image IM and the print medium P reach the nip portion between the transfer member 2 and the pressurizing drum 42, the ink image IM is transferred to the print medium P, and the printed product P' is formed. Passing through the nip portion, the inspection unit 9A captures an image printed on the printed product P' and inspects the printed image. The conveyance apparatus 1B conveys the printed product P' to the collection unit 8d.

When a portion where the ink image IM on the transfer member 2 is formed reaches the cleaning unit 5D, it is cleaned by the cleaning unit 5D as shown in a state ST6. After the cleaning, the transfer member 2 rotates once, and transfer of the ink image to the print medium P is performed repeatedly in the same procedure. The description above has been given such that transfer of the ink image IM to one print medium P is performed once in one rotation of the transfer member 2 for the sake of easy understanding. It is possible, however, to continuously perform transfer of the ink image IM to the plurality of print media P in one rotation of the transfer member 2.

Figure 7:
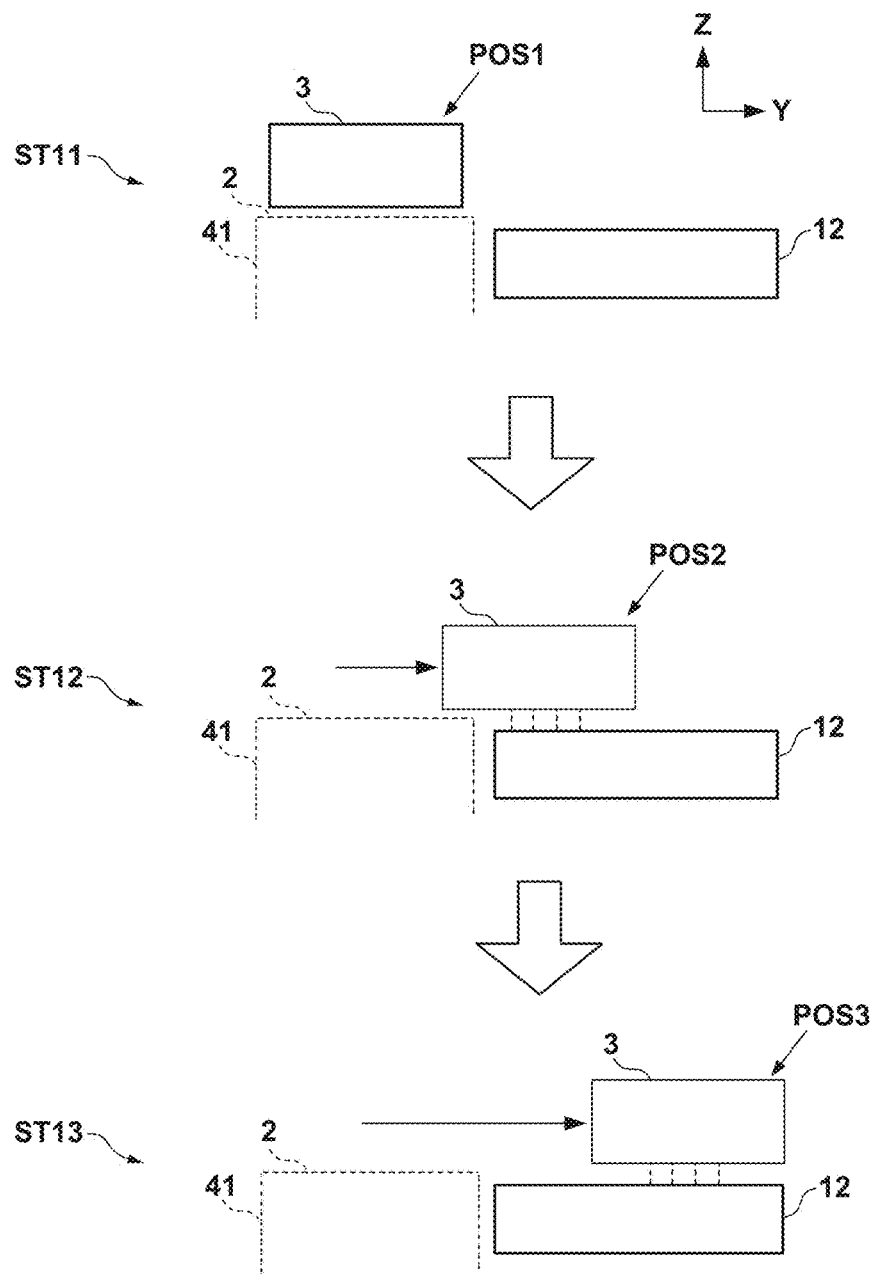
FIG. 7 is an explanatory view showing an example of the operation of the printing system in FIG. 1.

Each printhead 30 needs maintenance if such a printing operation continues. FIG. 7 shows an operation example at the time of maintenance of each printhead 30. A state ST11 shows a state in which the print unit 3 is positioned at the discharge position POS1. A state ST12 shows a state in which the print unit 3 passes through the preliminary recovery position POS2. Under passage, the recovery unit 12 performs a process of recovering discharge performance of each printhead 30 of the print unit 3. Subsequently, as shown in a state ST13, the recovery unit 12 performs the process of recovering the discharge performance of each printhead 30 in a state in which the print unit 3 is positioned at the recovery position POS3.

<Absorption Unit>

Figure 8:
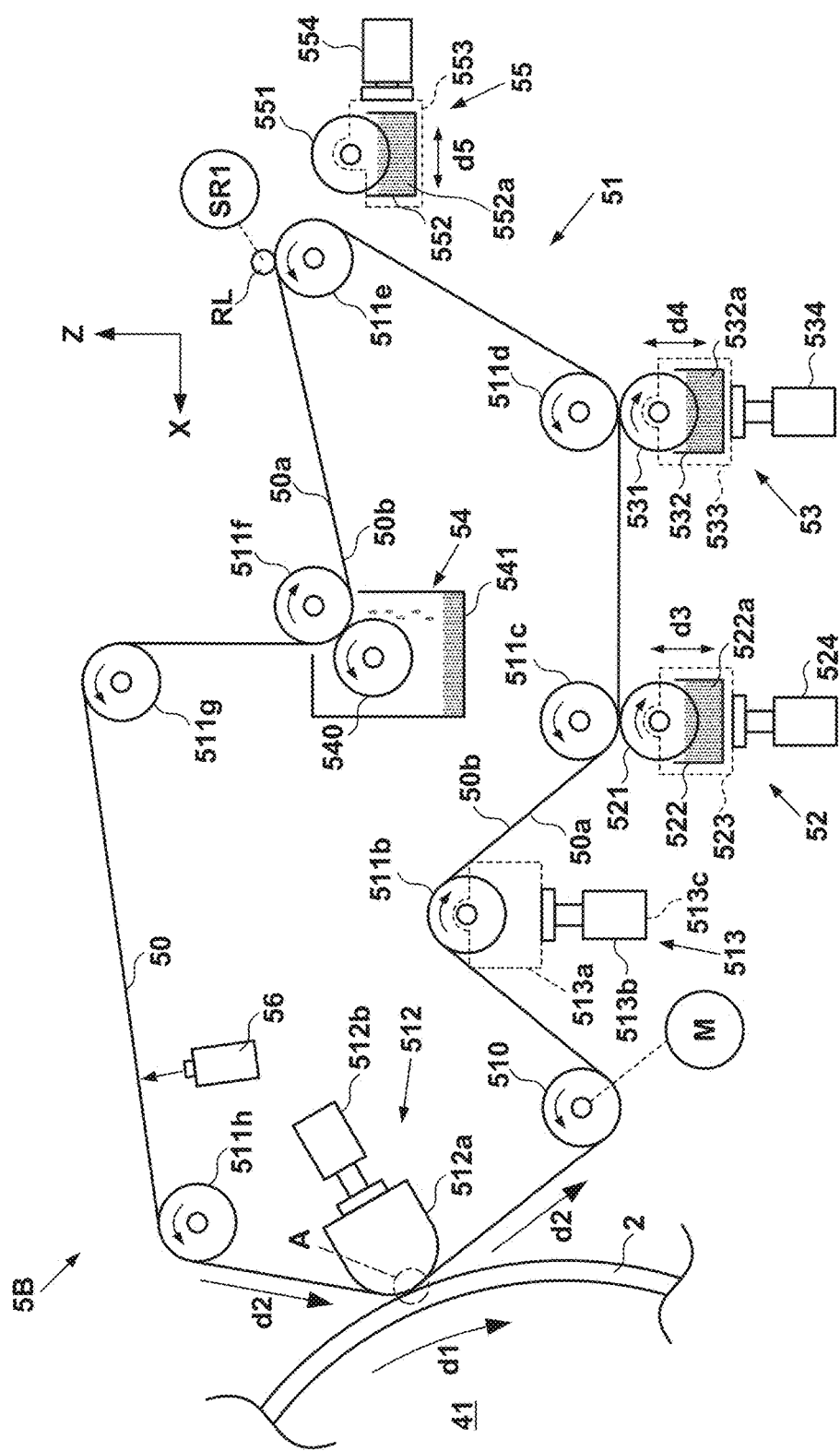
FIG. 8 is a schematic view showing an absorption unit.

A detailed example of the absorption unit 5B will be described with reference to FIG. 8. FIG. 8 is a schematic view showing an example of the absorption unit 5B. The absorption unit 5B is a liquid absorbing apparatus that absorbs a liquid component from the ink image IM formed on the transfer member 2 before the ink image IM is transferred to the print medium P. When the water-soluble pigment ink is used as in this embodiment, the absorption unit 5B mainly aims at absorbing moisture in the ink image. This makes it possible to suppress occurrence of a curl or cockling of the print medium P.

The absorption unit 5B includes a liquid absorbing member 50, a driving unit 51 that cyclically moves the liquid absorbing member 50, a displacing unit 512, a plurality of kinds of recovery units 52 to 54, a preprocessing unit 55, and a detection unit 56.

The liquid absorbing member 50 is an absorber that absorbs the liquid component from the ink image IM and is a liquid absorbing sheet formed into an endless belt in the example of FIG. 8. A liquid absorbing position A is a position where the liquid absorbing member 50 absorbs the liquid component from the ink image IM on the transfer member 2 and indicates a portion where the liquid absorbing member 50 gets closest to the transfer member 2. An arrow d1 indicates a moving direction of the transfer member 2, and an arrow d2 indicates a moving direction of the liquid absorbing member 50.

The liquid absorbing member 50 may be formed by a single layer but may be formed by multiple layers. A double layer structure of an obverse layer and a reverse layer is exemplified here. The obverse layer forms a first surface 50a contacting the ink image IM, and the reverse layer forms a second surface 50b. The liquid absorbing member 50 absorbs the liquid component of the ink image IM on the transfer member 2. The liquid component of the ink image IM penetrates from the obverse layer into the liquid absorbing member 50 and further penetrates into the reverse layer. The ink image IM moves toward the heating unit 5C with a decreased liquid component.

Each of the obverse layer and the reverse layer can be made of a porous material. The average pore size of the reverse layer can be made larger than that of the obverse layer in order to increase absorption performance of the liquid component while suppressing adherence of the coloring material. This makes it possible to promote movement of the liquid component from the obverse layer to the reverse layer.

A material for the obverse layer may be, for example, a hydrophilic material whose contact angle with respect to water is less than 90° or a water-repellent material whose contact angle with respect to water is 90° or more. For the hydrophilic material, the material may have the contact angle with respect to water to be 40° or less. The contact angle may be measured complying with a technique described in, for example, "6. static method" of JIS R3257.

The hydrophilic material has an effect of drawing up a liquid by a capillary force. Cellulose, polyacrylamide, or a composite material of these can be given as the hydrophilic material. When the water-repellent material is used, a hydrophilic treatment may be performed on its surface. A method such as sputter etching can be given as the hydrophilic treatment.

For example, a fluorine resin can be given as the water-repellent material. For example, polytetrafluoroethylene, polychlorotrifluoroethylene, polyvinylidene fluoride, or the like can be given as the fluorine resin. A time may be taken until the effect of drawing up the liquid is exerted when the water-repellent material is used for the obverse layer. To cope with this, a liquid whose contact angle with the obverse layer is less than 90° may be impregnated into the obverse layer.

For example, resin-fiber nonwoven fabric or woven fabric can be given as a material for the reverse layer. The material for the reverse layer may have the contact angle of water equal to or larger than that for the obverse layer because the liquid component does not flow backward from the reverse layer to the obverse layer. For example, polyolefin, polyurethane, polyamide such as nylon, polyester, polysulfone, or a composite material of these can be given as the material for the reverse layer.

For example, adhesive lamination, thermal lamination, or the like can be given as a laminating method of the obverse layer and the reverse layer.

The driving unit 51 is a mechanism which supports the liquid absorbing member 50 such that it can rotate and move cyclically so as to pass through the liquid absorbing position A, and includes a drive rotating body 510 and a plurality of driven rotating bodies 511b to 511h. The drive rotating body 510 and the driven rotating bodies 511b to 511h are rollers or pulleys around which the swath liquid absorbing member 50 is wound, and are supported rotatably about an axis in the Y direction.

The drive rotating body 510 is a conveyance rotating body, such as a conveyance roller, that rotates by a driving force of a motor M, and rotates and moves the liquid absorbing member 50. The driven rotating bodies 511b to 511h are supported freely rotatably. In this embodiment, these drive rotating body 510 and driven rotating bodies 511b to 511h define a rotational moving path of the liquid absorbing member 50. The rotational moving path of the liquid absorbing member 50 is a zigzag path winding up and down when viewed from a rotational moving direction (arrow d2). This makes it possible to use the longer liquid absorbing member 50 in a smaller space and to decrease a replacement frequency upon performance deterioration in the liquid absorbing member 50.

The driven rotating body 511b includes a tension adjustment mechanism 513. The tension adjustment mechanism 513 is a mechanism which adjusts the tension of the liquid absorbing member 50 and includes a support member 513a, a moving mechanism 513b, and a sensor 513c. The support member 513a supports the driven rotating body 511b rotatably about the axis in the Y direction. The moving mechanism 513b is a mechanism which moves the support member 513a and is, for example, an electrically-driven cylinder. The moving mechanism 513b can displace the position of the driven rotating body 511b, adjusting the tension of the liquid absorbing member 50. The sensor 513c detects the tension of the liquid absorbing member 50. In this embodiment, the sensor 513c detects a load received by the moving mechanism 513b. The tension of the liquid absorbing member 50 can be controlled automatically by controlling the moving mechanism 513b based on a detection result of the sensor 513c.

The displacing unit 512 is a mechanism which displaces the liquid absorbing member 50 between a contact state in which the liquid absorbing member 50 contacts the transfer member 2 and a retracted state in which the liquid absorbing member 50 is separated from the transfer member 2. In this embodiment, the displacing unit 512 acts on a part of the liquid absorbing member 50, and displaces the liquid absorbing member 50 between a state in which the part contacts the transfer member and a state in which the part is separated from the transfer member. However, the displacing unit 512 may move the liquid absorbing member 50 as a unit.

The displacing unit 512 includes a movable member 512a and a pressing mechanism 512b. The movable member 512a is arranged facing the transfer member 2 and has a peripheral surface where the liquid absorbing member 50 slidably moves. The pressing mechanism 512b is a mechanism which moves the movable member 512a forward/backward with respect to the transfer member 2, and is, for example, an electrically-driven cylinder. The part of the liquid absorbing member is pressed against the transfer member 2 via the movable member 512a by driving the pressing mechanism 512b.

Figure 9A:
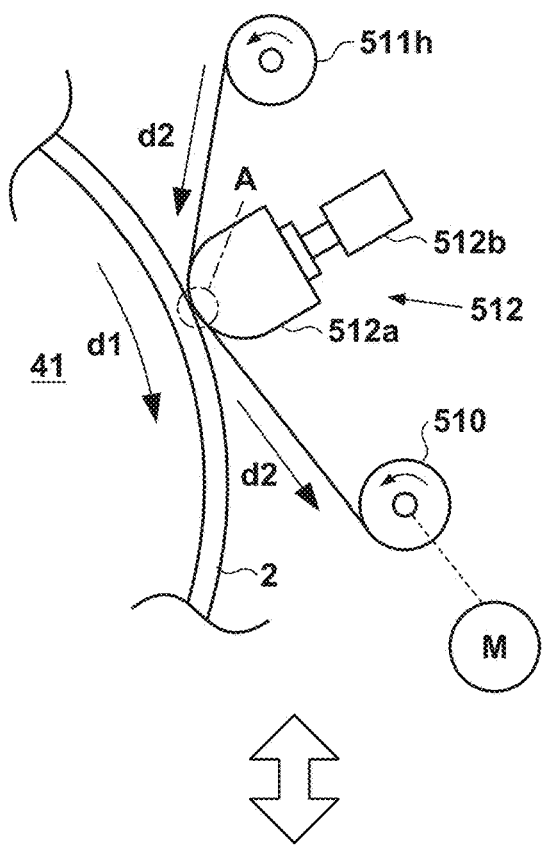
FIGS. 9A and 9B are explanatory views showing the operation of a displacing unit.
Figure 9B:
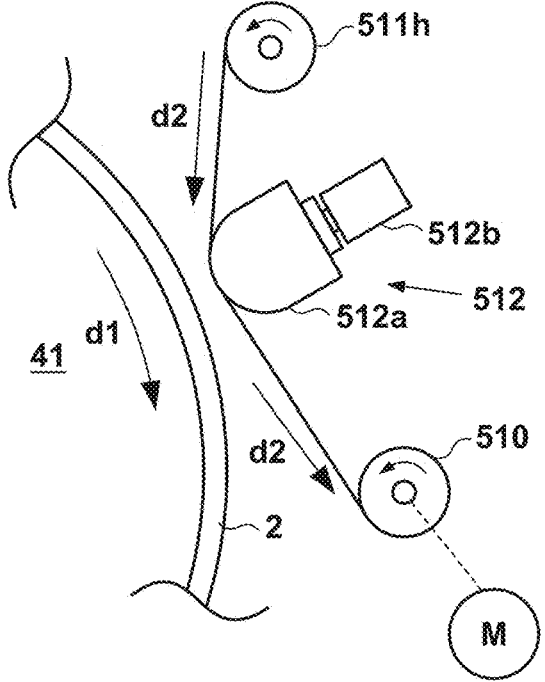

FIGS. 9A and 9B are explanatory views showing the operation of the displacing unit 512. FIG. 9A shows a state in which the liquid absorbing member 50 is displaced to the contact state. FIG. 9B shows a state in which the liquid absorbing member 50 is displaced to the retracted state.

When the liquid absorbing member 50 is displaced to the contact state, the liquid absorbing member 50 and the transfer member 2 contact each other at the liquid absorbing position A. At the liquid absorbing position A, the liquid absorbing member 50 is nipped by the transfer member 2 and the movable member 512a. The liquid absorbing member 50 is advantageously pressed against the transfer member 2 in terms of liquid absorption efficiency. During a printing operation, the driving unit 51 controls the liquid absorbing member 50 so that a rotational moving velocity of the liquid absorbing member 50 becomes equal to a peripheral velocity of the transfer member 2. This prevents friction between the liquid absorbing member 50 and the transfer member 2 or the ink image IM.

The retracted state can be at a position where the liquid absorbing member 50 can be separated from the transfer member 2, and a distance between the contact state and the retracted state can be short. A direction in which the part of the liquid absorbing member 50 moves between the contact state and the retracted state, that is, the pressing/releasing direction of the pressing mechanism 512b is a direction crossing the tangential direction of the transfer member 2 at the liquid absorbing position A and is, for example, a perpendicular direction.

The liquid absorbing member 50 is arranged to contact or separate from the transfer member 2 freely by providing the displacing unit 512, making it easier to perform a maintenance operation or warm-up of the transfer member 2 and liquid absorbing member 50 individually.

Referring back to FIG. 8, a sensor SR1 detects a rotational moving velocity or rotational moving amount of the liquid absorbing member 50. The sensor SR1 is, for example, a rotary encoder. In this embodiment, a rotating body RL of the sensor SR1 contacts the liquid absorbing member 50, rotates in accordance with rotation and movement of the liquid absorbing member 50, and detects its rotation amount. The rotating body RL is arranged facing the driven rotating body 511e. The rotational moving velocity or rotational moving amount of the liquid absorbing member 50 can also be specified by detecting and calculating the rotation velocity of the drive rotating body 510 or the driven rotating bodies 511b to 511h. However, the liquid absorbing member 50 may slip with respect to these rotating bodies, and thus, a value different from an actual moving velocity of the liquid absorbing member 50 may be obtained.

The cleaning unit 52, the application unit 53, and the collection unit 54 (to be collectively referred to as recovery units hereinafter) are apparatuses that recover the liquid absorption performance of the liquid absorbing member 50. By providing such recovery mechanisms, it is possible to suppress the performance deterioration in the liquid absorbing member 50 and maintain the liquid absorption performance for a longer time. This makes it possible to decrease the replacement frequency of the liquid absorbing member 50.

In this embodiment, the three kinds of recovery units 52 to 54 different in function are arranged in the middle of the moving path of the liquid absorbing member 50. However, only one recovery unit may be provided. Alternatively, a plurality of recovery units having a common function may be provided.

The cleaning unit 52 and the application unit 53 perform processes on the first surface 50a, and the collection unit 54 performs a process on the second surface 50b. By performing the different processes for the first surface 50a and the second surface 50b, it is possible to recover the liquid absorption performance of the liquid absorbing member 50 more properly.

The cleaning unit 52 is an apparatus that cleans the liquid absorbing member 50. The cleaning unit 52 includes a cleaning roller 521, a reservoir 522, a support member 523, and a moving mechanism 524. The support member 523 supports the cleaning roller 521 rotatably about the axis in the Y direction and also supports the reservoir 522. A cleaning liquid 522a is reserved in the reservoir 522. The cleaning roller 521 is partially immersed in the cleaning liquid 522a. The moving mechanism 524 is a mechanism which moves the support member 523 and is, for example, an electrically-driven cylinder. The cleaning roller 521 and the reservoir 522 also move when the support member 523 moves. They move in the direction of an arrow d3 (here, the vertical direction) between a cleaning position at which the cleaning roller 521 contacts the liquid absorbing member 50 and a retracted position at which the cleaning roller 521 is separated from the liquid absorbing member 50. FIG. 8 shows a state in which the cleaning roller 521 is located at the cleaning position (a state during a recovery operation). The cleaning roller 521 may be located at the cleaning position during the operation of the printing system 1 and may move to the retracted position at the time of maintenance.

The cleaning roller 521 is arranged facing the driven rotating body 511c. The liquid absorbing member 50 is nipped by the cleaning roller 521 and the driven rotating body 511c when the cleaning roller 521 moves to the cleaning position. The cleaning roller 521 rotates in accordance with rotation and movement of the liquid absorbing member 50. The peripheral surface of the cleaning roller 521 is formed by, for example, a cohesive material and removes a dust particle (paper dust, or the like) adhered to the first surface 50a of the liquid absorbing member 50 by contacting the first surface 50a. For example, rubber of butyl, silicone, urethane, or the like, can be used as a material for the peripheral surface of the cleaning roller 521. The cleaning liquid 522a is, for example, a surfactant, and can use a liquid that promotes separation of a dust particle adhered to the cleaning roller 521. The reservoir 522 may include a wiper that promotes separation of a dust particle by contacting the surface of the cleaning roller 521.

In this embodiment, an arrangement that removes the dust particle adhered to the first surface 50a of the liquid absorbing member 50 by the cleaning roller 521 is adopted. However, another arrangement such as an arrangement that removes the dust particle by blowing air may also be adopted.

The application unit 53 is an apparatus that applies a moisturizing liquid to the liquid absorbing member 50. The application unit 53 includes an application roller 531, a reservoir 532, a support member 533, and a moving mechanism 534. The support member 533 supports the application roller 531 rotatably about the axis in the Y direction and also supports the reservoir 532. A moisturizing liquid 532a is reserved in the reservoir 532. The application roller 531 is partially immersed in the moisturizing liquid 532a. The moving mechanism 534 is a mechanism which moves the support member 533 and is, for example, an electrically-driven cylinder. The application roller 531 and the reservoir 532 also move when the support member 533 moves. They move in the direction of an arrow d4 (here, the vertical direction) between an application position at which the application roller 531 contacts the liquid absorbing member 50 and a retracted position at which the application roller 531 is separated from the liquid absorbing member 50. FIG. 8 shows a state in which the application roller 531 is located at the application position (a position during the recovery operation). The application roller 531 may be located at the application position during the operation of the printing system 1 and may move to the retracted position at the time of maintenance.

The application roller 531 is arranged facing the driven rotating body 511*d*. The liquid absorbing member 50 is nipped by the application roller 531 and the driven rotating body 511*d* when the application roller 531 moves to the application position. The application roller 531 rotates in accordance with rotation and movement of the liquid absorbing member 50. The peripheral surface of the application roller 531 is formed by, for example, rubber and supplies the moisturizing liquid 532*a* reserved in the reservoir 532 to the first surface 50*a* of the liquid absorbing member 50 by drawing the moisturizing liquid 532*a*. The moisturizing liquid 532*a* is, for example, water. The moisturizing liquid 532*a* may contain a water-soluble organic solvent or a surfactant.

The first surface 50*a* may be thickened by using the liquid absorbing member 50, and this may degrade absorption performance of the liquid component from the ink image IM. It is possible to suppress thickening of the first surface 50*a* and maintain the absorption performance of the liquid component by applying the moisturizing liquid 532*a* to the first surface 50*a*.

In this embodiment, an arrangement that draws the moisturizing liquid 532*a* to the first surface 50*a* of the liquid absorbing member 50 by the application roller 531 is adopted. However, another arrangement such as an arrangement that sprays the moisturizing liquid 532*a* to the first surface 50*a* by a nozzle may also be adopted.

The collection unit 54 is an apparatus that removes the liquid component from the liquid absorbing member 50. The collection unit 54 includes a removing roller 540 and a reservoir 541 that stores the removed liquid component.

The removing roller 540 is arranged facing the driven rotating body 511*f*. The liquid absorbing member 50 is nipped by the removing roller 540 and the driven rotating body 511*f* when the removing roller 540 moves to a removal position. The removing roller 540 rotates in accordance with rotation and movement of the liquid absorbing member 50. The liquid absorbing member 50 is sandwiched between the removing roller 540 and the driven rotating body 511*f*, squeezing out the liquid component absorbed by the liquid absorbing member 50. In that sense, the driven rotating body 511*f* commonly uses a part of the collection unit 54.

In the collection unit 54, the second surface 50*b* of the liquid absorbing member 50 is located on the lower side in a gravity direction, and the first surface 50*a* is located on the upper side in the gravity direction. Therefore, it is more likely that the liquid component is squeezed out of the side of the second surface 50*b* than of the side of the first surface 50*a* and falls due to gravity. It is possible to ensure a region for absorbing the liquid component in the reverse layer and recover the liquid absorption performance of the liquid absorbing member 50 by promoting removal of the liquid component from the second surface 50*b*. It is also possible to suppress drying of the first surface 50*a* to which the moisturizing liquid is applied by the application unit 53.

As described above, in this embodiment, an arrangement is adopted in which the cleaning unit 52, the application unit 53, and the collection unit 54 perform recovery processing in the processing order of the removal of the dust particle, moisturizing, and the removal of the liquid component from an upstream side to a downstream side in the rotational moving direction of the liquid absorbing member 50. The processing order is not limited to this. According to the processing order of this embodiment, however, the application unit 53 moisturizes the first surface 50*a* after the cleaning unit 52 cleans the first surface 50*a*, making it possible to promote the removal of the dust particle and an improvement in moisture retention. Moreover, the collection unit 54 removes the liquid component relatively on the downstream side, making it possible to remove the liquid component in a place where the second surface 50*b* moves at a high position in the gravity direction. This has the advantage that the removed liquid component is easily collected by using gravity.

The preprocessing unit 55 will be described next. The preprocessing unit 55 is an apparatus that mainly performs preprocessing for making full use of the liquid absorption performance of the liquid absorbing member 50 in a short time at the start of the operation of the printing system 1 or the like. In this embodiment, a preprocessing liquid is applied to the first surface 50*a* of the liquid absorbing member 50, improving a rise in liquid absorption performance. For example, when an obverse layer 501 is made of the water-repellent material, the preprocessing liquid can use a surfactant. F-444 (trade name, available from DIC) or ZonylFS3100 (trade name, available from DuPont) of a fluorochemical surfactant, CapstoneFS-3100 (trade name, available from The Chemours CompanyLCC), BYK349 (trade name, available from BYK) of a silicone-based surfactant, or the like is given as the surfactant.

The preprocessing unit 55 includes an application roller 551, a reservoir 552, a support member 553, and a moving mechanism 554. The support member 553 supports the application roller 551 rotatably about the axis in the Y direction and also supports the reservoir 552. A preprocessing liquid 552*a* is reserved in the reservoir 552. The application roller 551 is partially immersed in the preprocessing liquid 552*a*. The moving mechanism 554 is a mechanism which moves the support member 553 and is, for example, an electrically-driven cylinder. The application roller 551 and the reservoir 552 also move when the support member 553 moves. They move in the direction of an arrow d5 (here, the horizontal direction) between an application position at which the application roller 551 contacts the liquid absorbing member 50 and a retracted position at which the application roller 551 is separated from the liquid absorbing member 50. FIG. 8 shows a state in which the application roller 551 is located at the retracted position. The application roller 551 can move to the application position at the start of the operation of the printing system 1 or periodically (for example, in the unit of the number of print media P to be processed).

The application roller 551 is arranged facing the driven rotating body 511*e*. The liquid absorbing member 50 is nipped by the application roller 551 and the driven rotating body 511*e* when the application roller 551 moves to the application position. The application roller 551 rotates in accordance with rotation and movement of the liquid absorbing member 50. The peripheral surface of the application roller 551 is formed by, for example, rubber and supplies the preprocessing liquid 552*a* reserved in the reservoir 552 to the first surface 50*a* of the liquid absorbing member 50 by drawing the preprocessing liquid 552*a*.

With this arrangement, the absorption unit 5B absorbs the liquid component from the ink image IM on the transfer member 2 by the liquid absorbing member 50. The liquid component can be absorbed from the ink image IM continuously by absorbing the liquid component simultaneously with cyclical movement of the liquid absorbing member 50. In addition, the liquid absorption performance of the liquid absorbing member 50 can be maintained for a longer period of time by providing the cleaning unit 52, the application unit 53, and the collection unit 54, making it possible to prolong a replacement cycle of the liquid absorbing member 50.

The detection unit 56 is a sensor that detects passage of a predetermined portion of the liquid absorbing member 50 at a predetermined position on the moving path of the liquid absorbing member 50. In this embodiment, the liquid absorbing member 50 is provided with a marker, and the detection unit 56 detects the marker. By using, as a starting point, detection of the mark by the detection unit 56, with reference to the detection result of the sensor SR1, it is possible to recognize a specific position on the moving path of the liquid absorbing member 50, at which a specific portion of the liquid absorbing member 50 is located.

In this embodiment, the detection unit 56 is arranged at a position comparatively near the liquid absorbing position A. In one round of the moving path of the liquid absorbing member 50 with the liquid absorbing position A as a starting point and an ending point, the position of the detection unit 56 can be a position on a side closer to the ending point than an intermediate point or a position on a side closer to the ending point than an intermediate point between the intermediate point and the ending point.

<Acceleration Control>

In this embodiment, the displacing unit 512 can move the liquid absorbing member 50 to contact or separate from the transfer member 2. When displacing the liquid absorbing member 50 from the retracted state to the contact state, if there is a difference in velocity between the transfer member 2 and the liquid absorbing member 50, friction may occur between them at the liquid absorbing position A. To cope with this, when displacing the liquid absorbing member 50 from the retracted state to the contact state, the liquid absorbing member 50 and the transfer member 2 may be moved at a low velocity or stopped. After displacement, the moving velocities of the transfer member 2 and the liquid absorbing member 50 are synchronously accelerated to the movement velocities at the time of a printing operation. The synchronous acceleration operation can reduce occurrence of friction between the transfer member 2 and the liquid absorbing member 50. However, the liquid absorbing member 50 and the transfer drum 41 include different driving sources or driving mechanisms, and thus a difference may be generated in responsiveness of acceleration control. As a result, friction can occur between the transfer member 2 and the liquid absorbing member 50 at the liquid absorbing position A during the acceleration operation.

If the acceleration operation is repeated in the same region on the liquid absorbing member 50, friction concentrates on the region, degrading durability. To cope with this, in this embodiment, the setting of the acceleration operation start portion of the liquid absorbing member 50, that is located at the liquid absorbing position A when starting the acceleration operation, is changed for every predetermined unit. FIG. 10A shows examples of the acceleration operation start portion.

FIG. 10A exemplifies four acceleration operation start portions AP1 to AP4 (to be collectively referred to as acceleration operation start portions AP hereinafter). In the example of FIG. 10A, the acceleration operation start portion AP1 is set at the position of a marker 50d as a detection target of the detection unit 56. The acceleration operation start portions AP2 to AP4 are set at positions separated from the marker 50d. The distances between the marker 50d and the respective acceleration operation start portions AP1 to AP4 are known data from the viewpoint of control. The setting of the acceleration operation start portion AP is changed for each operation of displacing the liquid absorbing member 50 from the retracted state to the contact state in an order of AP1, AP2, AP3, AP4, AP1 . . . . This can avoid a region on the liquid absorbing member 50, that has passed through the liquid absorbing position A in the last acceleration operation from overlapping that in the current acceleration operation. As a result, it is possible to prevent the acceleration operation from being repeated in the same region on the liquid absorbing member 50, preventing the life of the liquid absorbing member 50 from being shortened.

As the change order of the setting of the acceleration operation start portion AP, instead of sequentially changing the acceleration operation start portion AP as in the above example, the same acceleration operation start portion AP may be used a plurality of times and then changed to another acceleration operation start portion AP in an order of AP1, AP1, AP2, AP2 . . . every time the liquid absorbing member 50 is displaced from the retracted state to the contact state. Alternatively, every time the liquid absorbing member 50 is displaced from the retracted state to the contact state, the acceleration operation start portion AP may be changed randomly in an order of AP1, AP3, AP2, AP1, AP4 . . . . In either case, it is only necessary to avoid the acceleration operation from being performed repeatedly in a specific region.

As for a unit (timing) for changing the setting of the acceleration operation start portion AP, the number of times the liquid absorbing member 50 is displaced from the retracted state to the contact state may be used as a reference. The number of times may be one or a plurality of times (for example, three). The number of times of execution of a print job, the number of days, or time may be used as a reference.

The distance between the adjacent acceleration operation start portions AP may exceed a distance required for the acceleration operation or may be equal to or shorter than it. FIG. 10B schematically exemplifies an example of the distance between the adjacent acceleration operation start portions AP1 and AP2. A distance necessary to accelerate the moving velocity of the liquid absorbing member 50 to that at the time of a printing operation after displacing the liquid absorbing member 50 from the retracted state to the contact state is exemplified by L1 or L2.

The distance L1 is shorter than the distance between the acceleration operation start portions AP1 and AP2. If the distance between the adjacent acceleration operation start portions AP exceeds the distance L1 necessary for the acceleration operation, regions used for the acceleration operations do not overlap each other every time the setting of the acceleration operation start portion AP is changed, which is thus advantageous in terms of shortening of the life of the liquid absorbing member 50.

The distance L2 is longer than the distance between the acceleration operation start portions AP1 and AP2. If the distance between the adjacent acceleration operation start portions AP is shorter than the distance L2 necessary for the acceleration operation, the entire region of the liquid absorbing member 50 can be used for the acceleration operation.

Figure 11A:
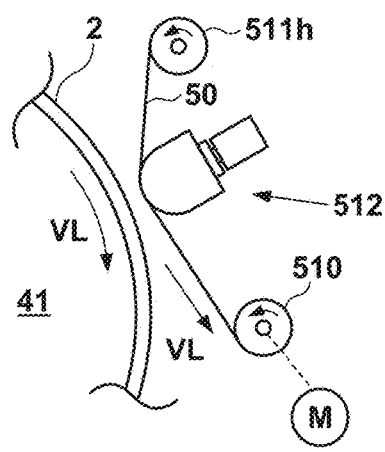
FIGS. 11A to 11C are explanatory views showing acceleration control.
Figure 11B:
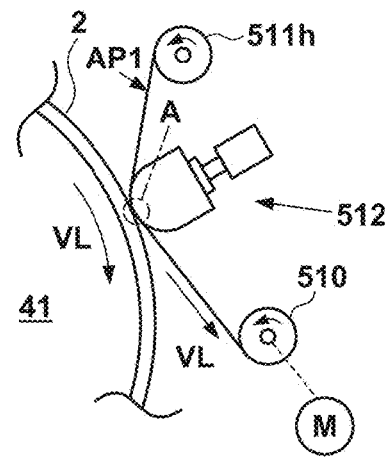
Figure 11C:
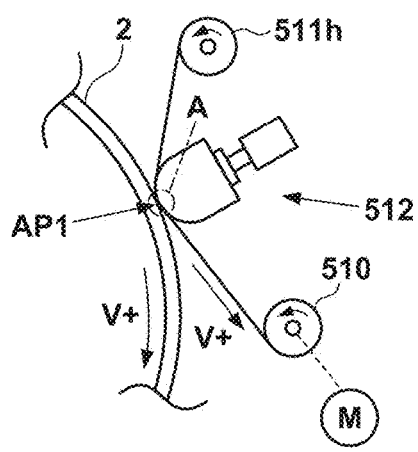

FIGS. 11A to 11C exemplify acceleration control when the acceleration operation start portion AP1 is set. In a stage shown in FIG. 11A, the liquid absorbing member 50 is in the retracted state. The moving velocity (peripheral velocity) of the transfer member 2 and the rotational moving velocity of the liquid absorbing member 50 are controlled to become a velocity VL lower than the moving velocities at the time of a printing operation.

Figure 11D:
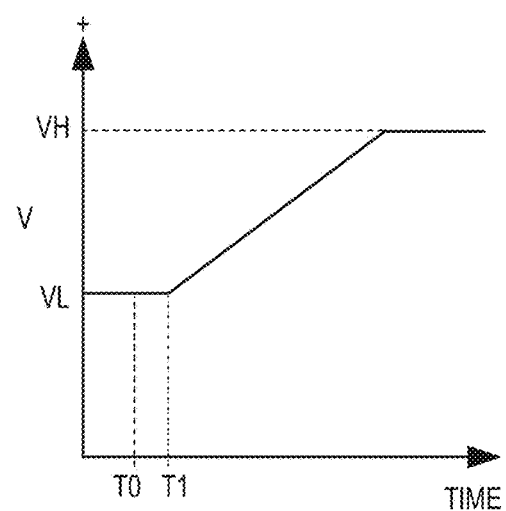
FIG. 11D is a timing chart showing the acceleration control.

In a stage shown in FIG. 11B, the liquid absorbing member 50 is displaced to the contact state by the displacing unit 512. Based on the detection results of the detection unit 56 and the sensor SRL a portion of the liquid absorbing member 50 that passes through the liquid absorbing position A is calculated and monitored. In a stage shown in FIG. 11C, the acceleration operation start portion AP1 has reached the liquid absorbing position A, and thus an acceleration operation of the transfer member 2 and the liquid absorbing member 50 starts. FIG. 11D is a timing chart showing changes in moving velocities of the transfer member 2 and the liquid absorbing member 50. Time T0 indicates the stage shown in FIG. 11B. In this stage, although the liquid absorbing member 50 is displaced to the contact state by the displacing unit 512, the acceleration operation start portion AP1 has not reached the liquid absorbing position A, and thus no acceleration operation starts. Time T1 indicates the stage shown in FIG. 11C. In this stage, the acceleration operation start portion AP1 has reached the liquid absorbing position A, and thus an acceleration operation starts. The moving velocities of the transfer member 2 and the liquid absorbing member 50 are synchronously accelerated to a velocity VH at the time of a printing operation, and the velocity VH is maintained.

FIGS. 12A to 12D exemplify acceleration control when the setting of the acceleration operation start portion AP is changed from AP1 to AP2. In a stage shown in FIG. 12A, the liquid absorbing member 50 is in the retracted state. The moving velocity (peripheral velocity) of the transfer member 2 and the rotational moving velocity of the liquid absorbing member 50 are controlled to become the velocity VL lower than the moving velocities at the time of a printing operation.

Figure 12A:
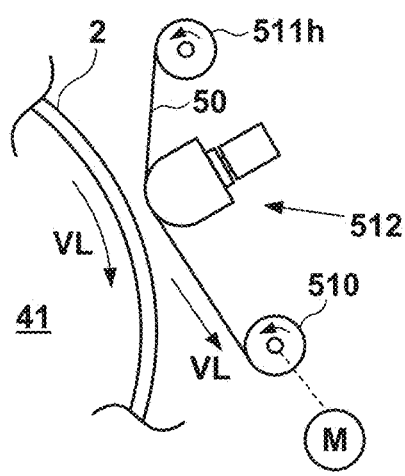
FIGS. 12A to 12D are explanatory views showing change of the setting of the acceleration operation start portion.
Figure 12B:
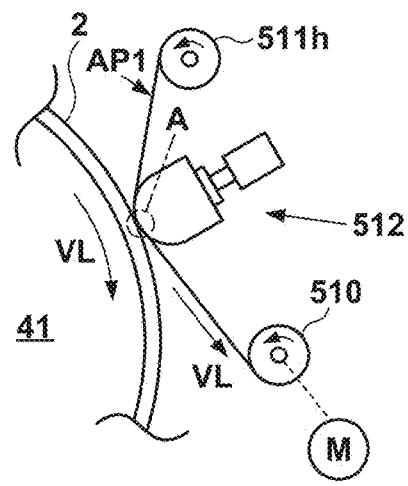
Figure 12C:
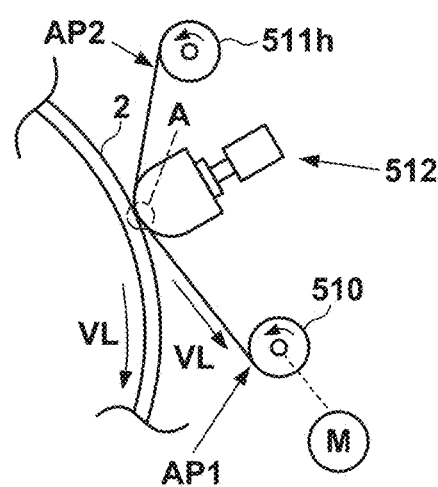
Figure 12D:
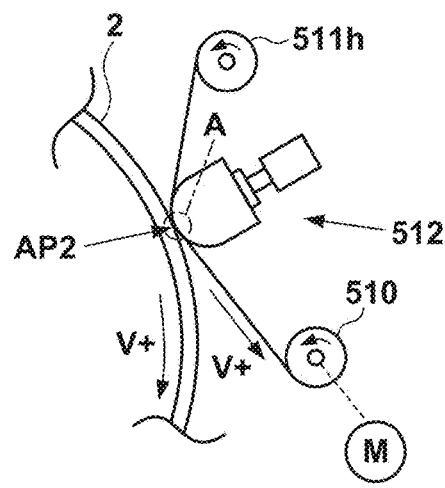

In a stage shown in FIG. 12B, the liquid absorbing member 50 is displaced to the contact state by the displacing unit 512. In a stage shown in FIG. 12C, the acceleration operation start portion AP1 has reached the liquid absorbing position A but no acceleration operation starts. In a stage shown in FIG. 12D, the acceleration operation start portion AP2 has reached the liquid absorbing position A, and thus an acceleration operation of the transfer member 2 and the liquid absorbing member 50 starts. By changing the setting of the acceleration operation start portion AP in this way, the region of the liquid absorbing member 50 used for the acceleration operation can be shifted.

Note that as shown in FIGS. 11B and 12B, when displacing the liquid absorbing member 50 to the contact state, portions of the liquid absorbing member 50, that contact the liquid absorbing position A first, may be the same or different. If the same portion is made to contact first, a time (moving distance) during which driving is performed at the velocity VL after the contact changes in accordance with the setting of the acceleration operation start portion AP. If a different portion is made to contact first, the portion that is made to contact first may be set in accordance with the setting of the acceleration operation start portion AP. This can set the same time (moving distance) during which driving is performed at the velocity VL after the contact.

<Example of Processing of Control Unit>

Figure 13:
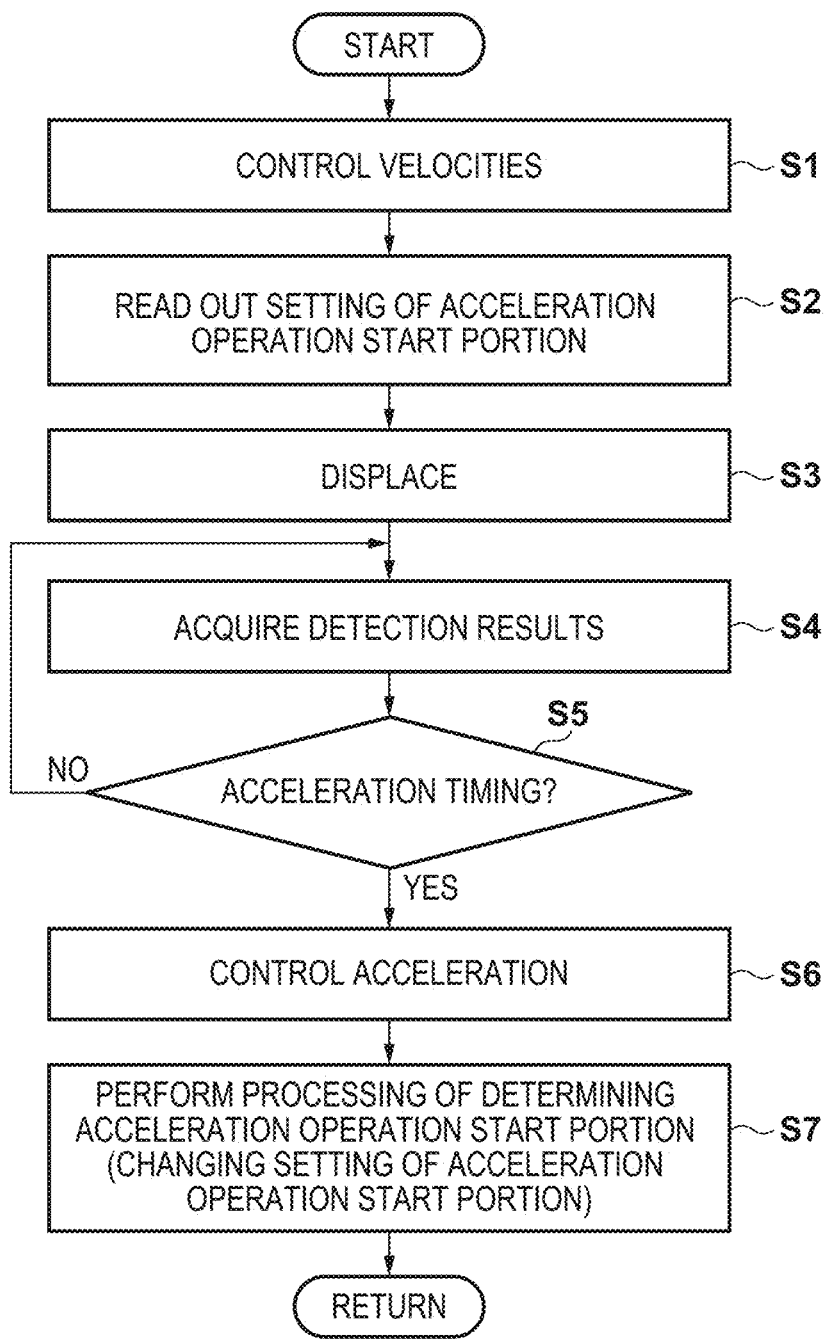
FIG. 13 is a flowchart illustrating an example of control.

An example of processing of the displacement control of the liquid absorbing member 50 and the acceleration control of the transfer member 2 and the liquid absorbing member 50 will be described. The transfer control unit 15B controls the transfer unit 4 and the absorption unit 5B. FIG. 13 shows an example of processing executed by the transfer control unit 15B. This processing example is executed when the liquid absorbing member 50 is in the retracted state. This processing example includes the control of displacing the liquid absorbing member 50 from the retracted state to the contact state, the acceleration control of the transfer member 2 and the liquid absorbing member 50, and the processing of changing the acceleration operation start portion AP.

In step S1, the velocities of the transfer member 2 and the liquid absorbing member 50 are controlled. In this example, the peripheral velocity of the transfer member 2 and the rotational moving velocity of the liquid absorbing member 50 are controlled to become the velocity VL. In step S2, the current setting of the acceleration operation start portion AP is read out. The setting of the acceleration operation start portion AP is stored in the storage device of the transfer control unit 15B.

In step S3, the pressing mechanism 512b is driven to displace the liquid absorbing member 50 to the contact state. The liquid absorbing member 50 contacts the transfer member 2. In step S4, the detection results of the detection unit 56 and the sensor SR1 are acquired, and a portion of the liquid absorbing member 50, that passes through the liquid absorbing position A, is monitored. In step S5, it is determined whether the timing of starting the acceleration operation of the transfer member 2 and the liquid absorbing member 50 has come. If the acceleration operation start portion AP read out in step S2 has reached the liquid absorbing position A, it is determined that the acceleration operation start timing has come, and the process advances to step S6; otherwise, the process returns to step S4.

In step S6, the acceleration operation of the transfer member 2 and the liquid absorbing member 50 starts. If the moving velocities of the liquid absorbing member 50 and the transfer member 2 reach the velocity VH, the acceleration operation ends to maintain the velocity VH. In step S7, the acceleration operation start portion AP to be used for next acceleration control is set. For example, if the current acceleration operation start portion AP is AP1, it is changed to AP2. Then, one processing operation ends. After that, a printing operation starts.

<Another Method of Setting Acceleration Operation Start Portion>

Figure 14:
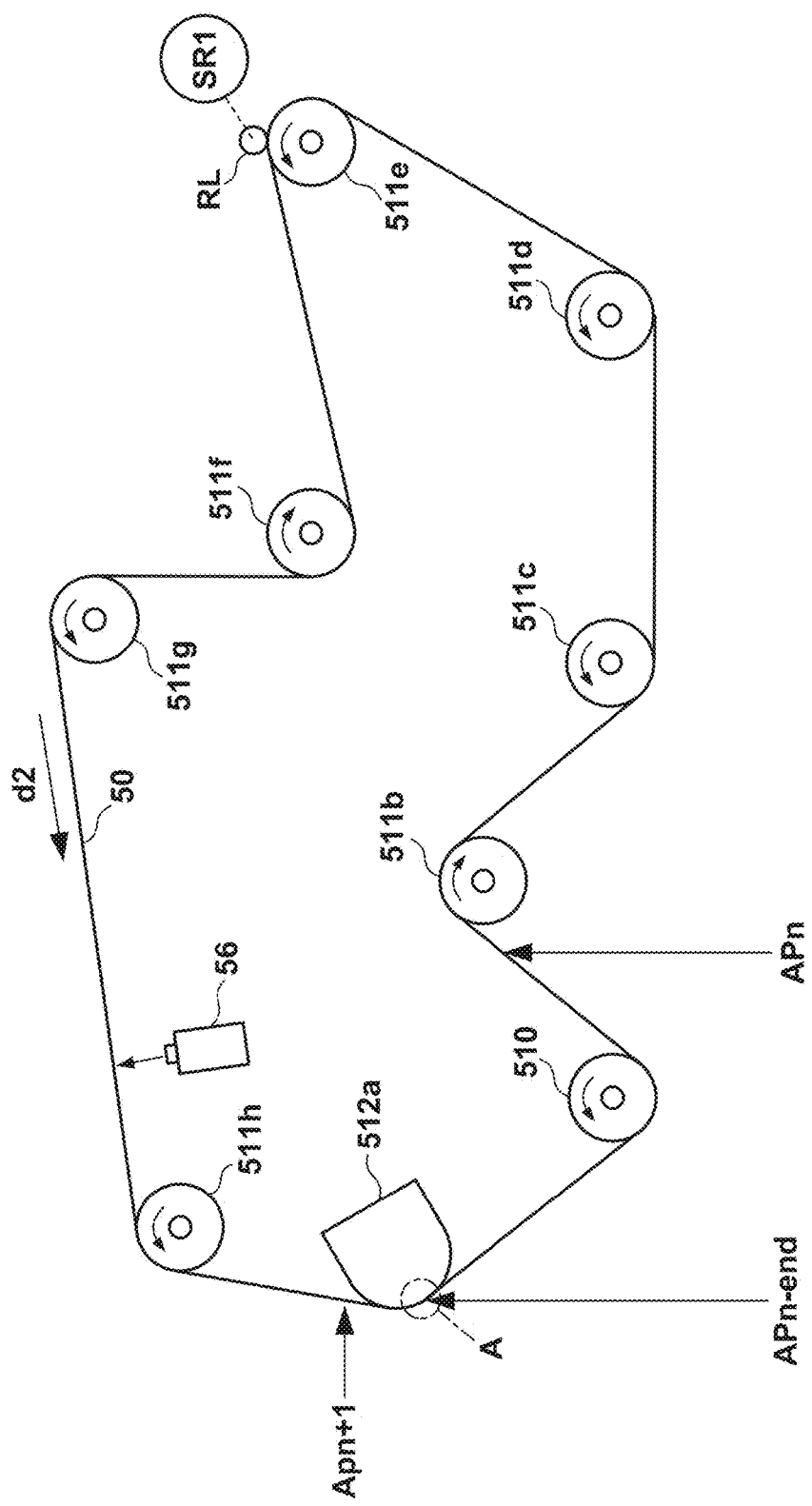
FIG. 14 is a view showing another method of setting an acceleration operation start portion.

In the example of FIG. 10A, the method of determining in advance a plurality of candidates (AP1 to AP4) of the acceleration operation start portion AP and selecting one of them at the time of change is adopted. However, an arbitrary acceleration operation start portion may be set every time without determining in advance candidates of the acceleration operation start portion AP. FIG. 14 is an explanatory view of this.

An example shown in FIG. 14 assumes that an acceleration operation start portion APn is set as the current acceleration operation start portion AP, and the acceleration operation of the liquid absorbing member 50 ends in an end portion APn-end. As a next acceleration operation start portion APn+1, a portion other than a region from the acceleration operation start portion APn of the liquid absorbing member 50 to the acceleration operation end portion APn-end is set. For example, a portion separated backward from the acceleration operation end portion APn-end by a predetermined distance in the moving direction of the liquid absorbing member 50 is set. In this way, the acceleration operation start portion AP may be changed to an arbitrary acceleration operation start portion every time.

<Another Embodiment of Displacement Control and Acceleration Control of Liquid Absorbing Member with Respect to Transfer Member>

When displacing the liquid absorbing member 50 from the retracted position to the contact position, a slight impact is generated between the liquid absorbing member 50 and the transfer member 2. This causes performance deterioration in the transfer member 2. To solve this problem, in this embodiment, a transfer section and a non-transfer section are provided on the side of a transfer member 2. An ink image IM is formed on the transfer section and the non-transfer section is not used to form the ink image IM. While the non-transfer section is located at a liquid absorbing position A, a liquid absorbing member 50 is displaced to a contact position.

FIG. 16A shows an example of the arrangement of a transfer drum 41 and the transfer members 2. The transfer drum 41 in the example of FIG. 16A includes a cylindrical outer peripheral surface, and concave portions 41*a* are formed at an equal angular pitch (90°-pitch in the example of FIG. 16A) around a rotation axis. Each concave portion 41*a* is a space where a gripper that grips an end portion of the transfer member 2 is arranged. In the example of FIG. 16A, four transfer members 2 (in other words, four segments) are held on the outer peripheral surface of the transfer drum 41 intermittently in a circumferential direction. In this arrangement, the surface regions of the four transfer members 2 form transfer sections TR1 to TR4 (to be collectively referred to as TR hereinafter). The ink image IM is formed on each transfer section TR. Each transfer section TR corresponds to one print medium P. In other words, an arrangement capable of transferring the ink images IM to a maximum of four print media P in one rotation of the transfer drum 41 is adopted.

Non-transfer sections NR1 to NR4 (to be collectively referred to as NR hereinafter) are formed between the adjacent transfer sections. In this embodiment, each concave portion 41*a* forms each non-transfer section NR, and is a gap between the adjacent transfer sections TR. Each non-transfer section NR is a region where no ink image IM is formed. By rotating the transfer drum 41, the transfer sections TR and the non-transfer sections NR are cyclically moved to the liquid absorbing position A in the order of the transfer section TR1, the non-transfer section NR1, the transfer section TR2, the non-transfer section NR2, etc.

A sensor SR2 is a sensor that detects the rotation amount of the transfer drum 41 and is, for example, a rotary encoder, a linear encoder, or the like. The sensor SR2 can detect the phase of the transfer drum 41, recognizing the position of each of the transfer section TR and non-transfer section NR. Therefore, the timing at which the transfer section TR or the non-transfer section NR passes through the liquid absorbing position A is recognized.

Figure 17A:
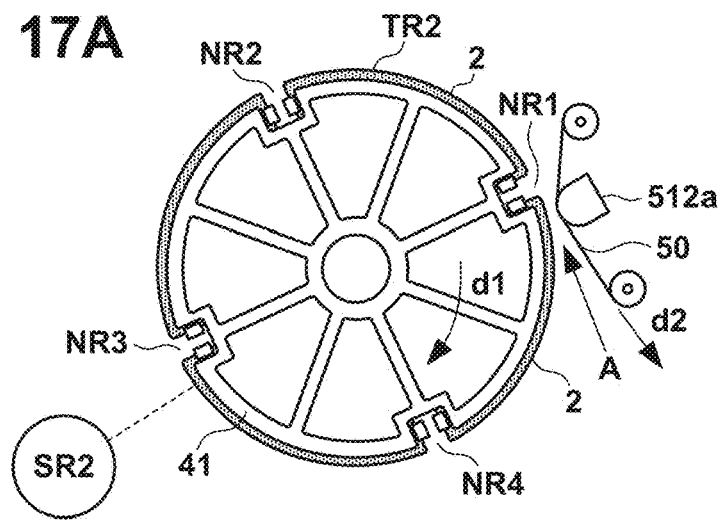
FIGS. 17A to 17C are views showing an example of control of a displacing unit.
Figure 17B:
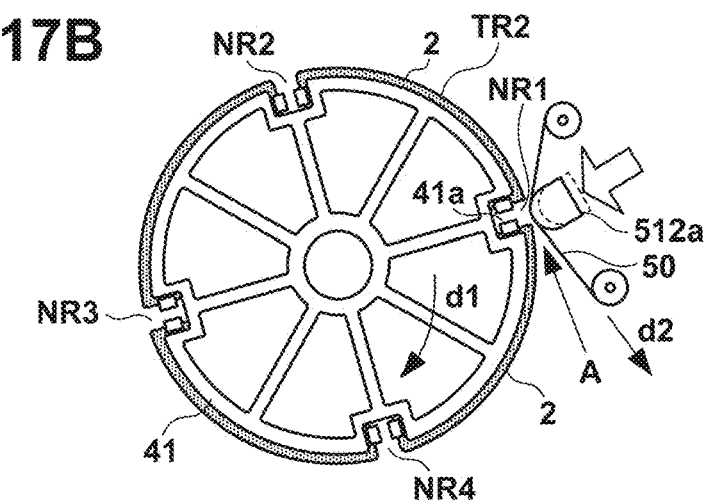
Figure 17C:
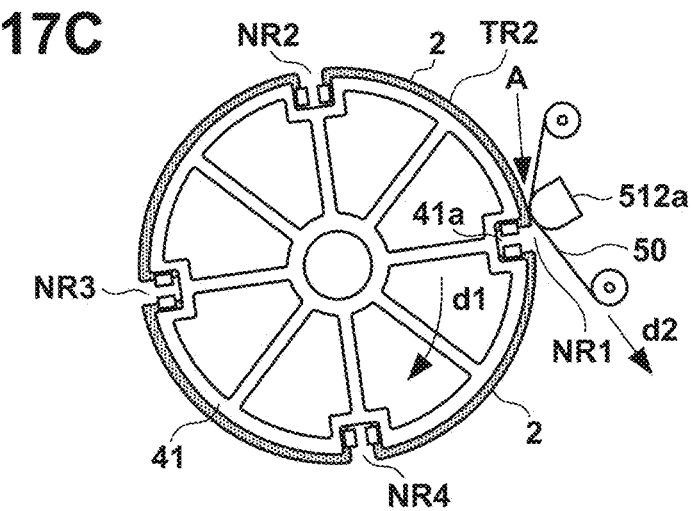

FIGS. 17A to 17C show an example of control of displacing the liquid absorbing member 50 from the retracted state to the contact state. When displacing the liquid absorbing member 50, the transfer drum 41 and the liquid absorbing member 50 may be at rest. However, when it is necessary to displace the liquid absorbing member 50 to the retracted state after the start of a printing system 1, if the transfer drum 41 and the liquid absorbing member 50 are stopped every time, it takes time to restart them. To cope with this, in the example shown in FIGS. 17A to 17C, the liquid absorbing member 50 is displaced while the transfer drum 41 is rotated and the liquid absorbing member 50 is rotated and moved.

FIG. 17A shows a state in which the liquid absorbing member 50 is in the retracted state. The transfer drum 41 rotates in the direction of an arrow d1 and the liquid absorbing member 50 rotates and moves in the direction of an arrow d2. The rotation of the transfer drum 41 and the rotation and movement of the liquid absorbing member 50 are controlled so that the peripheral velocity of the transfer section TR and the rotational moving velocity of the liquid absorbing member 50 become equal to each other.

The phase of the transfer drum 41 is monitored in accordance with the detection result of the sensor SR2, and the liquid absorbing member 50 is displaced to the contact state at the timing when the non-transfer section NR reaches the liquid absorbing position A, as shown in FIG. 17B. In this stage, the transfer section TR does not contact the liquid absorbing member 50, and thus receives no impact, making it possible to prevent performance deterioration, for example, damage to the transfer section TR. Furthermore, in this embodiment, the non-transfer section NR is formed in the concave portion 41*a*. When the liquid absorbing member 50 is displaced to the contact state, the liquid absorbing member 50 does not contact the arrangement on the side of the transfer drum 41. That is, the liquid absorbing member 50 receives no impact, making it possible to prevent performance deterioration in it.

FIG. 17C shows a state in which the rotation of the transfer drum 41 progresses from the state shown in FIG. 17B and the transfer section TR and the liquid absorbing member 50 are in contact with each other. When the concave portion 41*a* passes through the liquid absorbing position A, the edge of the concave portion 41*a* of the transfer member 2 collides against the liquid absorbing member 50. Since, however, the transfer section TR and the liquid absorbing member 50 move in the same direction, an impact is not so large as to cause performance deterioration in them.

In this embodiment, with the above control, when the liquid absorbing member 50 is displaced from the retracted state to the contact state, an impact in the pressing direction of a pressing mechanism 512*b* does not act on the transfer section TR and the liquid absorbing member 50, making it possible to prevent performance deterioration in them.

Note that in the example of FIG. 16A, portions other than portions where the transfer members 2 are provided serve as the non-transfer sections. However, parts of the transfer member 2 may be used as the non-transfer sections. FIG. 16B shows an example of this. In the example of FIG. 16B, the transfer member 2 is provided on the outer peripheral surface of the transfer drum 41 over an entire circumference continuously in the circumferential direction. It is, therefore, possible to use the entire outer periphery of the transfer drum 41 as the transfer section. As in the example of FIG. 16B, however, parts of the periphery may be used as the non-transfer sections NR. In this case as well, the control described with reference to FIGS. 17A to 17C can be used to displace the liquid absorbing member 50 to the contact state at the timing when the non-transfer section NR reaches the liquid absorbing position A. In this case, an impact acts on the liquid absorbing member 50 but no impact acts on the transfer section TR, making it possible to prevent performance deterioration in the transfer section TR.

Figure 15A:
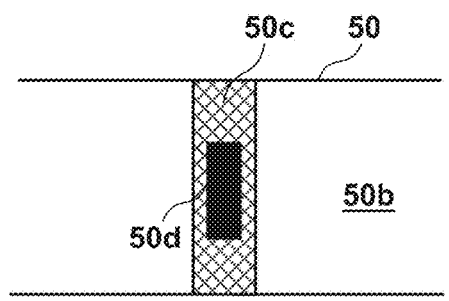
FIGS. 15A and 15B are views each showing an example of a marker.

The liquid absorbing member 50 according to this embodiment is formed into an endless sheet (endless belt) by connecting the two end portions of a sheet material, and a connecting portion exists. A detection unit 56 may detect the connecting portion of the liquid absorbing member 50. FIG. 15A is an explanatory view of this. FIG. 15A shows a connecting portion 50*c*. In this embodiment, a marker 50*d* indicating the position of the connecting portion 50*c* is provided on a second surface 50*b* of the liquid absorbing member 50. The detection unit 56 may be a sensor that identifies the connecting portion 50*c*. In this embodiment, however, the detection unit 56 detects the connecting portion 50*c* by detecting the marker 50*d*. The marker 50*d* is, for example, a marker different in color from another portion of the liquid absorbing member 50 (for example, the liquid absorbing member 50 is white, and the marker 50d is black). The detection unit 56 is, for example, a reflective photosensor. The position of the marker 50d is not necessarily on the second surface 50b, and may be on a first surface 50a. It is possible to avoid contact between the ink image IM and the marker 50d by providing the marker 50d on the second surface 50b.

Figure 15B:
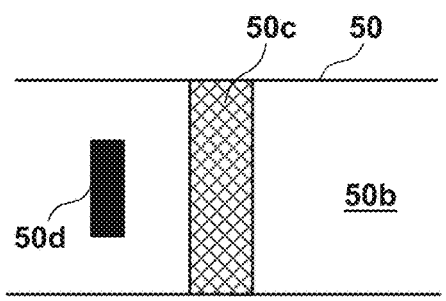

In this embodiment, the marker 50d is formed on the connecting portion 50c. However, the marker 50d may be formed at, for example, a position separated from the connecting portion 50c, as shown in FIG. 15B, as long as a predetermined positional relationship with the connecting portion 50c is known.

The connecting portion 50c may differ from the other portion of the liquid absorbing member 50 in characteristic of a liquid absorbing surface (first surface 50a). If the connecting portion 50c contacts the ink image IM, liquid absorption performance may be poor, as compared to the other portion. Furthermore, if the connecting portion 50c and the other portion contact the ink image IM simultaneously, a portion having a different remaining amount of a liquid component may be generated in the ink image IM. It is possible to control the timing at which the connecting portion 50c passes through the liquid absorbing position A by detecting, by the detection unit 56, the marker 50d to specify the position of the connecting portion 50c.

The liquid absorbing member 50 may be displaced from the retracted state to the contact state at the timing when the connecting portion 50c passes through the liquid absorbing position A. Opportunities for the connecting portion 50c to contact the transfer section TR can be decreased. The timing when the connecting portion 50c passes through the liquid absorbing position A can be specified based on the detection result of the detection unit 56. By adopting the following structure in addition to the control, it is possible to further decrease opportunities for the connecting portion 50c to contact the transfer section TR.

Figure 15C:
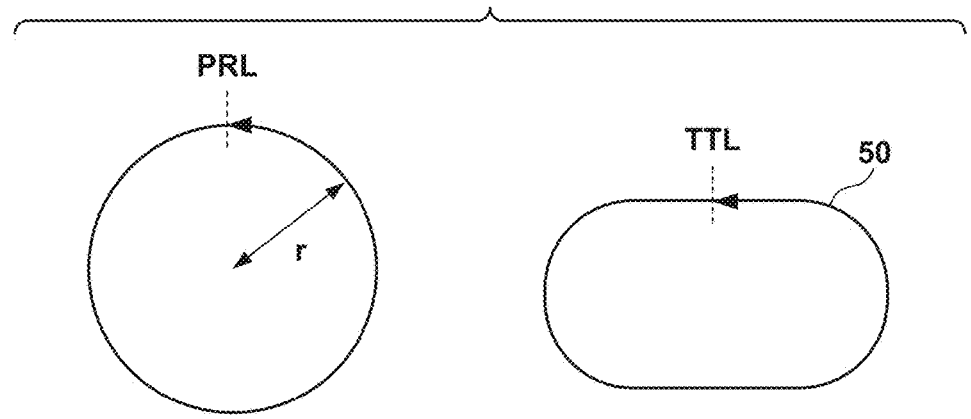
FIG. 15C is an explanatory view showing peripheral lengths.

In this structure, the peripheral length of the liquid absorbing member 50 is set to be equal to an integer multiple of the peripheral length of the surface of the transfer member 2 (in other words, the peripheral length of a circular orbit on which the transfer section moves). FIG. 15C is an explanatory view of this structure. A peripheral length PRL is the peripheral length of a virtual circle having a radius r from the rotation center of the transfer drum 41 to the surface of the transfer member 2. A peripheral length TTL is the peripheral length of the first surface 50a of the liquid absorbing member 50. If the peripheral length TTL=integer×peripheral length PRL, a portion on the side of the transfer member 2 facing the connecting portion 50c is always the same at the liquid absorbing position A.

Assuming that control is performed by making the peripheral velocity of the transfer section TR equal to the rotational moving velocity of the liquid absorbing member 50, the liquid absorbing member 50 is displaced from the retracted state to the contact state at the timing when the connecting portion 50c and the non-transfer section NR pass through the liquid absorbing position A. Thus, when the connecting portion 50c reaches the liquid absorbing position A, the non-transfer section NR also reaches the liquid absorbing position A at the same time. It is, therefore, possible to avoid the contact between the connecting portion 50c and the ink image IM.

Next, when displacing the liquid absorbing member 50 from the retracted state to the contact state while the non-transfer section NR is located at the liquid absorbing position A, a lower moving velocity of the non-transfer section NR (that is, a lower rotation velocity of the transfer drum 41) is advantageous in controlling the displacement timing. In this case, it is possible to prevent friction between the transfer section TR and the liquid absorbing member 50 by synchronously accelerating the peripheral velocity of the transfer member 2 and the rotational moving velocity of the liquid absorbing member 50 to velocities at the time of a printing operation after displacing the liquid absorbing member 50 from the retracted state to the contact state.

Figure 18:
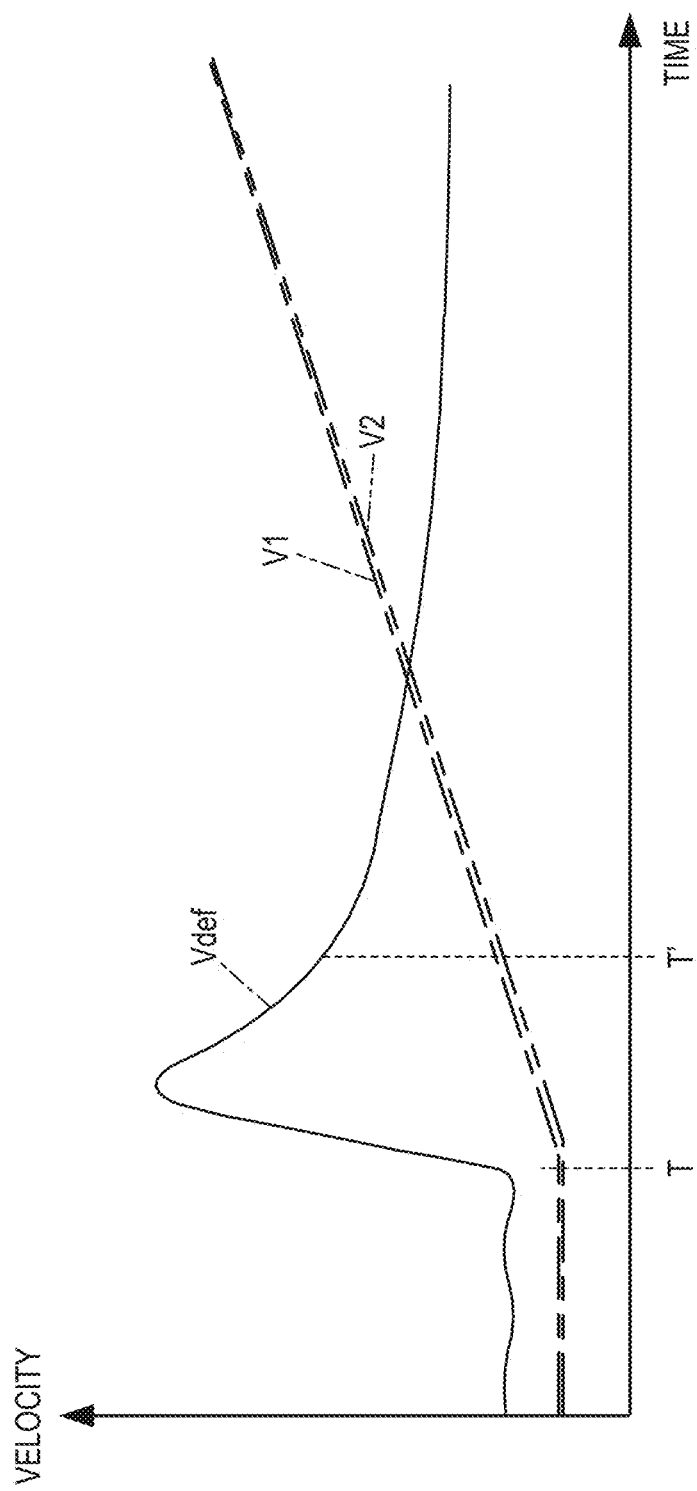
FIG. 18 is a timing chart showing an acceleration test result.

However, as described above, the liquid absorbing member 50 and the transfer drum 41 include different driving sources or driving mechanisms, and thus a difference may be generated in responsiveness of acceleration control. FIG. 18 shows the result of an acceleration test of the liquid absorbing member 50 and the transfer drum 41.

Referring to FIG. 18, a velocity V1 represents the peripheral velocity of the transfer member 2, a velocity V2 represents the rotational moving velocity of the liquid absorbing member 50, and a velocity difference Vdef represents the difference between the velocities V1 and V2. In the acceleration test, the liquid absorbing member 50 and the transfer member 2 are brought into contact with each other and the peripheral velocity V1 of the transfer member 2 and the rotational moving velocity V2 of the liquid absorbing member 50 are set to be equal to each other. At time T, an acceleration operation of the velocities V1 and V2 starts. The accelerations of the velocities V1 and V2 are equal to each other from the viewpoint of control, and the velocities V1 and V2 are synchronously accelerated.

According to the result of the test, the velocity difference Vdef becomes largest at the initial stage of the acceleration operation, and decreases after that. At the initial stage of the acceleration operation, the difference between the driving sources or driving mechanisms (for example, a difference in inertia) tends to exert an influence, and it is thus considered that a difference is generated in responsiveness. This indicates that friction readily occurs between the transfer member 2 and the liquid absorbing member 50 at the initial stage of the acceleration operation.

To cope with this, the acceleration operation of the transfer drum 41 and the liquid absorbing member 50 may start while a portion (a portion pressed by the movable member 512a) of the liquid absorbing member 50, that is located at a position where the liquid absorbing member 50 can contact the transfer member 2, is located in the concave portion 41a after displacing the liquid absorbing member 50 from the retracted state to the contact state. This makes it possible to bring the transfer section TR and the liquid absorbing member 50 into contact with each other at the timing when the velocity difference Vdef becomes small after the velocity difference Vdef becomes largest, reducing occurrence of friction between the transfer section TR and the liquid absorbing member 50. That is, when the transfer section TR contacts the liquid absorbing member 50, it is possible to avoid the peak of the velocity difference Vdef.

In terms of the relationship between the acceleration operation start portion AP and the acceleration control, the liquid absorbing member 50 is displaced from the retracted state to the contact state at the timing when the currently set acceleration operation start portion AP is located in the concave portion 41a.

Figure 21A:
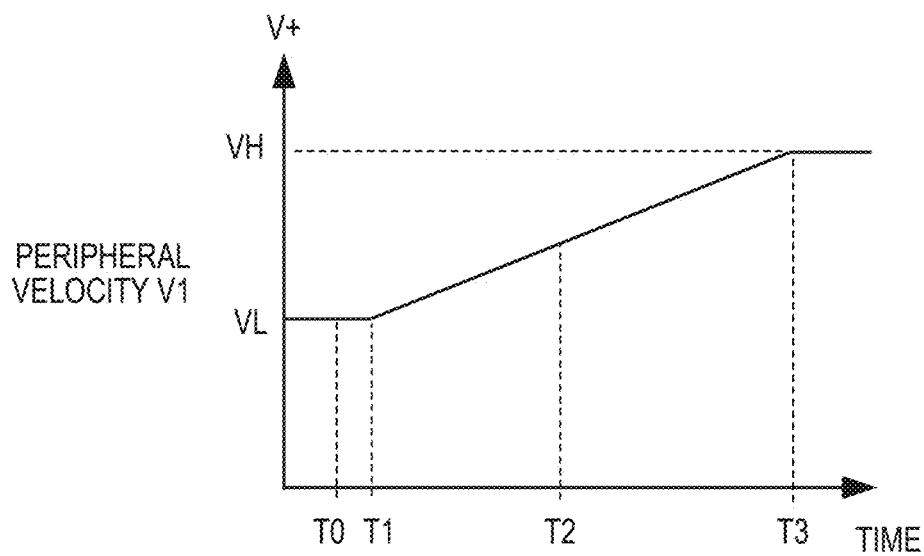
FIGS. 21A and 21B are timing charts showing the acceleration control.
Figure 21B:
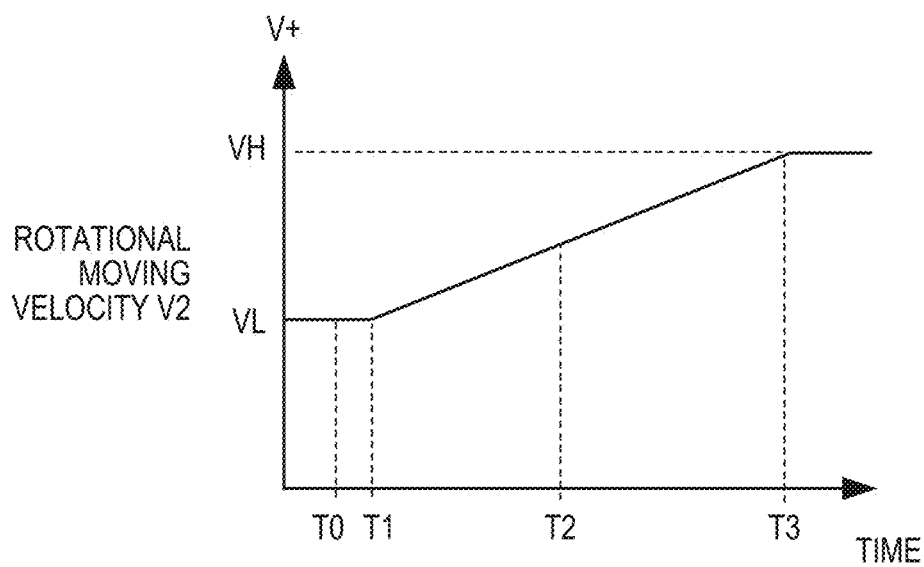

An example of the acceleration control will be described with reference to FIGS. 19 to 21B. FIGS. 19 and 20 show an example of the acceleration control of the liquid absorbing member 50 and the transfer section TR (that is, the transfer drum 41). FIGS. 21A and 21B respectively show examples (velocity control contents) of changes in peripheral velocity V1 of the transfer section TR and rotational moving velocity V2 of the liquid absorbing member 50 in the control shown in FIGS. 19 and 20. A velocity VH represents a velocity at the time of a printing operation, and a velocity VL VH) represents a velocity when displacing the liquid absorbing member 50 from the retracted state to the contact state.

When the liquid absorbing member 50 is in the retracted state, the velocities V1 and V2 are controlled by the velocity VL. At time T0, the liquid absorbing member 50 is displaced from the retracted state to the contact state. The portion 50A of the liquid absorbing member 50, that is located at the position where the liquid absorbing member 50 can contact the transfer member 2, is located in the concave portion 41a. A currently set acceleration operation start portion APn is located at a position slightly before the liquid absorbing position A.

At time T1, the acceleration operation start portion APn reaches the liquid absorbing position A and an acceleration operation of the velocities V1 and V2 starts. At time T2, the portion 50A reaches the end portion of the concave portion 41a on the back side in the rotation direction. The acceleration operation of the velocities V1 and V2 is in progress. Time T2 corresponds to, for example, a stage of time T' in FIG. 18. It is possible to avoid the peak of the velocity difference Vdef. At time T2, the acceleration operation may be complete. That is, the acceleration operation may start and end while the portion 50A is located in the concave portion 41a.

After T2, the liquid absorbing member 50 starts to contact the transfer member 2. At time T3, the acceleration operation ends, and the velocities V1 and V2 are controlled to be constant to become the velocity VH. At time T3, the portion 50A of the liquid absorbing member 50 is located on the transfer member 2 separately from the end of the concave portion 41a by a distance L. Within the range of the distance L from the end of the concave portion 41a, the portion 50A contacts the transfer member 2 while accelerating the velocities V1 and V2, and friction may occur to some extent. Therefore, a region R0 on the transfer member 2 including the range of the distance L may be set as a part of the non-transfer section NR not to be used as the transfer section TR. The acceleration control then ends.

A case will be described, in which this acceleration control is performed and the peripheral length of the liquid absorbing member 50 is set to be equal to an integer multiple of the peripheral length of the surface of the transfer member 2, as exemplified in FIG. 15C. If the peripheral length of the liquid absorbing member 50 is set to be equal to an integer multiple of the peripheral length of the surface of the transfer member 2, when the concave portion 41a reaches the liquid absorbing position A, the portion of the liquid absorbing member 50 and the concave portion 41a located at the liquid absorbing position A have a predetermined correspondence. As an example, consider a case in which the peripheral length of the liquid absorbing member 50 is equal (×1) to the peripheral length of the surface of the transfer member 2. The portions of the liquid absorbing member 50 face the respective concave portions 41a to have a one-to-one correspondence at the liquid absorbing position A. Therefore, four acceleration operation start portions AP1 to AP4 can be assigned to the four concave portions 41a, respectively. One of the four acceleration operation start portions AP1 to AP4 is set as the connecting portion 50c. In this case, even if any of acceleration operation start portions AP1 to AP4 is selected, the connecting portion 50c faces the corresponding concave portion 41a at the liquid absorbing position A, and does not contact the transfer section TR. Therefore, it is possible to prevent the connecting portion 50c from contacting the transfer section TR and change the acceleration operation start portion AP. In addition, the acceleration operation can start while the acceleration operation start portion AP is located in the concave portion 41a at the liquid absorbing position A. Even if the peripheral length of the liquid absorbing member 50 is an integer (≥2) multiple of the peripheral length of the surface of the transfer member 2, the same control processing can be performed.

Figure 22:
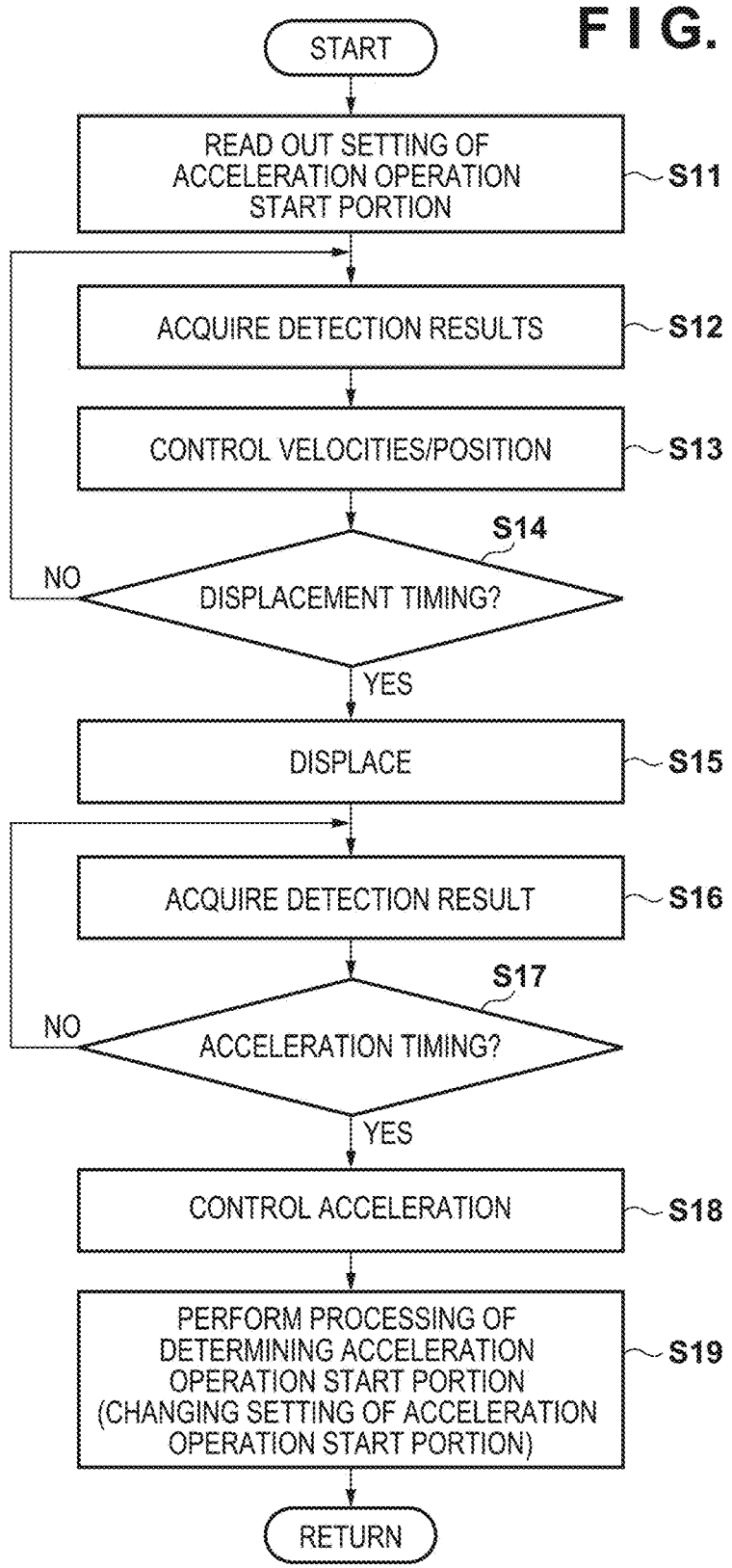
FIG. 22 is a flowchart illustrating an example of control.

An example of processing of the displacement control of the liquid absorbing member 50, the acceleration control of the transfer drum 41 and the liquid absorbing member 50, and the processing of changing the acceleration operation start portion AP according to this embodiment will be described next. FIG. 22 shows an example of processing executed by the transfer control unit 15B. This processing example is executed when the liquid absorbing member 50 is in the retracted state.

In step S11, the current setting of the acceleration operation start portion AP is read out. In step S12, the detection results of the detection unit 56, a sensor SR1, and the sensor SR2 are acquired. In step S13, based on the detection results acquired in step S12, the rotation velocity of the transfer drum 41 and the rotating/moving velocity and the position in the rotational moving direction of the liquid absorbing member 50 are controlled. In this example, the peripheral velocity V1 of the transfer member 2 is controlled to become the velocity VL. The rotational moving velocity V2 of the liquid absorbing member is finally controlled to become the velocity VL while adjusting the relative position of the liquid absorbing member 50 with respect to the transfer member 2 so that the acceleration operation start portion AP reaches the liquid absorbing position A at the timing when the concave portion 41a is located at the liquid absorbing position A.

In step S14, based on the detection results in step S12 and the control in step S13, it is determined whether the timing of displacing the liquid absorbing member 50 has come. If the timing when the concave portion 41a and the acceleration operation start portion AP are located at the liquid absorbing position A has come, it is determined that the displacement timing has come; otherwise, the process returns to step S12.

If it is determined in step S14 that the displacement timing has come, the process advances to step S15, and the pressing mechanism 512b is driven to displace the liquid absorbing member 50 to the contact state. The portion 50A is located in the concave portion 41a. In step S16, the detection result of the sensor SR1 is acquired. In step S17, it is determined based on the detection result acquired in step S16 whether the timing of starting the acceleration operation of the velocities V1 and V2 has come. If the acceleration operation start portion AP has reached the liquid absorbing position A, it is determined that the acceleration operation start timing has come; otherwise the process returns to step S16.

If it is determined in step S17 that the acceleration operation start timing has come, the process advances to step S18, and the acceleration operation of the velocities V1 and V2 starts. After the acceleration operation starts in the stage in which the portion 50A is located in the concave portion 41a and a peak of the velocity difference Vdef between the velocities V1 and V2 is generated, the portion 50A contacts the transfer member 2. When the velocities V1 and V2 reach the velocity VH, the acceleration operation ends to maintain the constant velocity state. In step S19, the acceleration operation start portion AP to be used for next acceleration control is determined and set. For example, if the current acceleration operation start portion AP is AP1, it is changed to AP2. Then, one processing operation ends. After that, a printing operation starts.

<Another Embodiment of System>

In the above embodiment, the print unit 3 includes the plurality of printheads 30. However, an arrangement may include one printhead 30. The printhead 30 need not be a full-line head but may be of a serial type that forms an ink image by discharging ink from the printhead 30 while a carriage that mounts the printhead 30 moves in a Y direction.

A conveyance mechanism of a print medium P may adopt another method such as a method of nipping and conveying the print medium P by a pair of rollers. In the method of conveying the print medium P by the pair of rollers or the like, a roll sheet may be used as the print medium P, and a printed product P' may be formed by cutting the roll sheet after transfer.

In the above embodiment, the transfer member 2 is provided on the outer peripheral surface of the transfer drum 41. However, another method, such as a method of forming a transfer member 2 into an endless swath and cyclically rotationally moving it may be used.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefits of Japanese Patent Application No. 2017-131495, filed Jul. 4, 2017, which is hereby incorporated by reference herein in its entirety.

What is claimed is:

1. A printing apparatus comprising:
    at least one transfer section configured to be moved cyclically;
    a print unit configured to form an ink image on the transfer section by discharging ink to the transfer section;
    a transfer unit configured to perform a transfer operation of transferring, to a print medium, the ink image formed on the transfer section;
    a liquid absorbing unit configured to absorb a liquid component from the ink image on the transfer section before the transfer operation, the liquid absorbing unit including:
        a liquid absorbing sheet configured to be moved cyclically, and
        a displacing unit configured to displace the liquid absorbing sheet between a contact state, in which the liquid absorbing sheet can contact the transfer section, and a retracted state, in which the liquid absorbing sheet is separated from the transfer section;
    an acceleration control unit configured to control, if the liquid absorbing sheet is displaced from the retracted state to the contact state, an acceleration operation of the transfer section and the liquid absorbing sheet; and
    a determination unit configured to determine an acceleration operation start portion which is located at a liquid absorbing position in which the liquid absorbing sheet contacts the transfer section when the acceleration control unit starts the acceleration operation.

2. The apparatus according to claim 1, wherein the determination unit determines the acceleration operation start portion among a plurality of predetermined portions of the liquid absorbing sheet.

3. The apparatus according to claim 2, wherein the acceleration operation start portion includes a connecting portion of a sheet material of the liquid absorbing sheet.

4. The apparatus according to claim 1, wherein the determination unit changes the acceleration operation start portion every time an operation of displacing the liquid absorbing sheet from the retracted state to the contact state is performed.

5. The apparatus according to claim 1, wherein the transfer unit moves the transfer section and a non-transfer section cyclically, and, if the non-transfer section is located at the liquid absorbing position, the acceleration control unit starts the acceleration operation.

6. The apparatus according to claim 1, wherein
    the transfer section moves on a circular orbit, and
    a peripheral length of the liquid absorbing sheet corresponds to an integer multiple of a peripheral length of the circular orbit.

7. The apparatus according to claim 6, wherein the transfer unit includes a transfer drum, the liquid absorbing sheet includes a connecting portion of a sheet material of the liquid absorbing sheet, the transfer sections are formed by a plurality of transfer members supported on a peripheral surface of the transfer drum intermittently in a circumferential direction, each of a plurality of concave portions is formed between the transfer members, which are adjacent to each other in the circumferential direction, and, while one of the plurality of concave portions is located at the liquid absorbing position, the liquid absorbing sheet is displaced from the retracted state to the contact state.

8. The apparatus according to claim 1, wherein, if the liquid absorbing sheet is displaced from the retracted state to the contact state, the transfer section and the liquid absorbing sheet move at velocities lower than velocities at the time of a printing operation, and the acceleration control unit accelerates the transfer section and the liquid absorbing sheet to the velocities at the time of the printing operation.

9. The apparatus according to claim 1, wherein the determination unit determines the acceleration operation start portion in a current acceleration operation so a region of the liquid absorbing sheet that has passed through the liquid absorbing position in a last acceleration operation does not overlap a region of the liquid absorbing sheet that has passed through the liquid absorbing position in the current acceleration operation.

10. The apparatus according to claim 1, wherein the liquid absorbing sheet in the contact state contacts the ink image on the transfer section to absorb the liquid component from the ink image so that ink forming the ink image is concentrated.

11. A control method for a printing apparatus including at least one transfer section configured to be moved cyclically, a print unit configured to form an ink image on the transfer section by discharging ink to the transfer section, a transfer unit configured to perform a transfer operation of transferring, to a print medium, the ink image formed on the transfer section, and a liquid absorbing unit configured to absorb a liquid component from the ink image on the transfer section before the transfer operation, the liquid absorbing unit including a liquid absorbing sheet configured to be moved cyclically, and a displacing unit configured to displace the liquid absorbing sheet between a contact state, in which the liquid absorbing sheet can contact the transfer section, and a retracted state, in which the liquid absorbing sheet is separated from the transfer section, the method comprising:

controlling, if the liquid absorbing sheet is displaced from the retracted state to the contact state, an acceleration operation of the transfer section and the liquid absorbing sheet; and determining an acceleration operation start portion, which is located at a liquid absorbing position at which the liquid absorbing sheet contacts the transfer section when starting the acceleration operation of the transfer section.

12. The method according to claim 11, wherein the liquid absorbing sheet in the contact state contacts the ink image on the transfer section to absorb the liquid component from the ink image so that ink forming the ink image is concentrated.

* * * * *